(12) United States Patent
Alkarmi et al.

(10) Patent No.: US 10,049,236 B1
(45) Date of Patent: Aug. 14, 2018

(54) IDENTIFICATION OF ITEMS WITHIN DELIVERY CONTAINERS

(71) Applicant: Amazon Technologies, Inc., Seattle, WA (US)

(72) Inventors: Ashraf Alkarmi, Seattle, WA (US); Yenchao Chua, Seattle, WA (US); Edward Hon, Seattle, WA (US); Praveen Krishnan, Redmond, WA (US); Gustavo Eduardo Lopez, Seattle, WA (US); Scott Pardy, Seattle, WA (US); Ruslan Anatolyevich Polyanskiy, Bothell, WA (US); Pawan Lata Uppuluri, Issaquah, WA (US); Evan Weiss, Seattle, WA (US); Gregory Forrest Wright, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 15 days.

(21) Appl. No.: 15/431,576

(22) Filed: Feb. 13, 2017

(51) Int. Cl.
  *G06F 17/00* (2006.01)
  *G06K 7/10* (2006.01)
  *G06K 7/14* (2006.01)

(52) U.S. Cl.
  CPC ....... *G06K 7/10009* (2013.01); *G06K 7/1413* (2013.01); *G06K 7/1417* (2013.01)

(58) Field of Classification Search
  CPC ............ G06K 7/10009; G06K 7/1413; G06K 7/1417; G06Q 30/02; G06Q 30/06; G06Q 20/20; G06Q 10/087; G06Q 10/08; G07F 7/1008
  USPC ......................................... 235/375, 383, 385
  See application file for complete search history.

(56) References Cited

U.S. PATENT DOCUMENTS

2013/0105578 A1\* 5/2013 Bolanos ................ G06Q 10/08
235/385

\* cited by examiner

*Primary Examiner* — Karl D Frech
(74) *Attorney, Agent, or Firm* — Lee & Hayes, PLLC

(57) ABSTRACT

A food item container that contains a food item may include one or more sensors that collect sensor data indicating a characteristic (e.g., temperature, humidity, pressure, orientation, etc.) associated with the food item. A delivery container that transports the food items within the food item container may also include one or more sensors that collect the sensor data. Based on the sensor data, a component of the food item container and/or the delivery container may maintain or adjust the characteristic. The one or more sensors of the delivery container may also detect an identifier associated with the food item container, which may indicate which food item containers (and corresponding food items) are included within each delivery container.

20 Claims, 8 Drawing Sheets

IDENTIFICATION OF ITEMS WITHIN DELIVERY CONTAINERS

BACKGROUND

Customers are increasingly placing online orders for various types of items for delivery. For instance, instead of preparing a meal at home, a customer may place an online order for food and/or drink items, where the food/drink items are then delivered to a location associated with the customer (e.g., a residence, a workplace, etc.). However, provided that a food item is intended to be consumed at a hot/warm temperature (e.g., hot soup), a cold temperature (e.g., ice cream), or at a particular condition, the amount of time between preparation of the food item and delivery to the customer may cause the food item to fall outside its ideal condition for consumption. This may result in customer complaints and/or requests for refunds. Existing processes for packaging food items for delivery and for transporting food items are inadequate to ensure that the food items arrive at a delivery destination in their intended consumption condition (e.g., hot, cold, crisp, etc.).

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
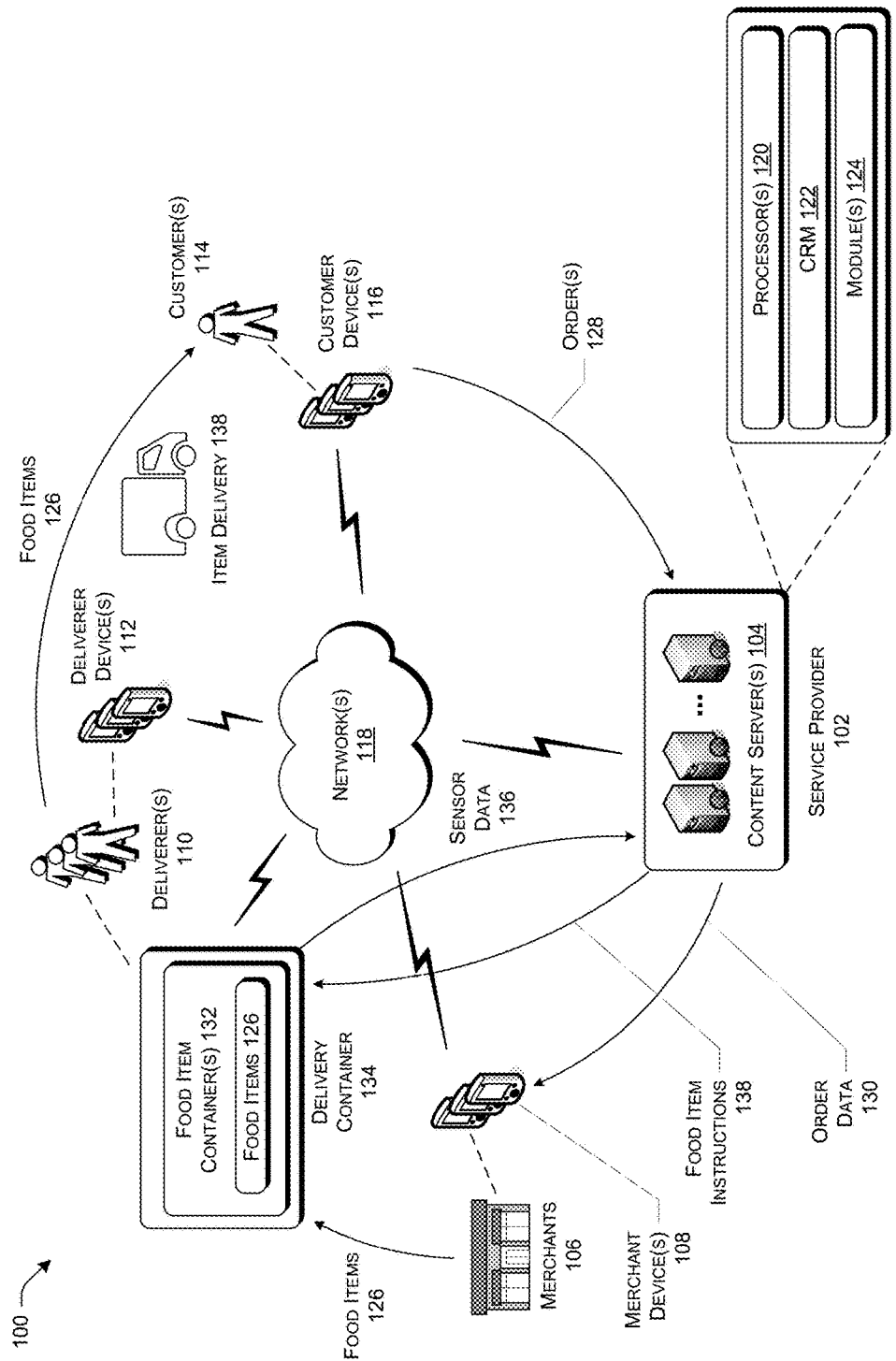
FIG. 1 illustrates an example system for maintaining and/or adjusting characteristics of a food item using a food item container and/or a delivery container.

Described herein are systems and/or processes for maintaining and/or adjusting characteristics (e.g., temperature, humidity, pressure, etc.) of items (e.g., food items, drink items, etc.) within a food item container while the food items are being delivered via a delivery container. In particular, certain food items are intended to be consumed in certain conditions, such as within a particular range of temperatures, at a particular humidity, and so on. For instance, certain types of soup are intended to be consumed when they are hot/warm, where an ice cream bar is intended to be consumed when cold/frozen. In existing systems, upon a customer placing an order for the delivery of a food item (food items and drink items may be collectively be referred to herein as "food item(s)"), a restaurant may prepare the food item, but the food item may sit until an individual is available to deliver the food item to the customer. The food item may then become cold (or warm) during the time in which the food item is being delivered from the location of the restaurant to the delivery location of the customer. When the food item is actually delivered, the restaurant (or an entity that received the order on behalf of the restaurant) will be unaware of the temperature and condition of the food item. This may be caused by the entity being unaware of the amount of time the food item sat at the restaurant, the time in which the food item was picked up for delivery, and possibly the actual delivery time. As a result, the entity/restaurant is unable to ensure that the quality, condition, and temperature of the food item, when delivered, meets or exceeds an expectation of the entity/restaurant and/or an expectation of the customer.

Moreover, in some instances, the food item may be too cold, too warm, spilled, broken, etc., when delivered to the customer. If any one of these issues were to occur, there is a high likelihood that the customer will be displeased, which may result in the customer requesting a discount, a refund, and/or a replacement of the food item. Accordingly, a poor customer experience for the customer will result, which may cause the customer to cease ordering food items from the entity/restaurant, and which may result in a corresponding loss in sales/revenue for the entity/restaurant.

The systems and/or processes described herein may maintain and/or adjust a characteristic (or the condition) of a food item during delivery so that the food item is delivered to the customer that placed the corresponding order in its ideal state for consumption. In particular, upon a restaurant merchant preparing an ordered food item, the restaurant merchant may place the food item in a food item container. When a deliverer that is to deliver the food item to a delivery location associated with a customer arrives at a location of the restaurant merchant, the deliverer may place the food item container (e.g., a to-go box) that contains the food item into a delivery container (e.g., a delivery bag, box, etc.). The food item container and/or the delivery container may include one or more sensors that obtains sensor data regarding one or more characteristics (e.g., temperature, pressure, humidity, orientation, etc.) of the food item. Upon the sensor(s) detecting/obtaining the sensor data, a component of the food item container and/or the delivery container may maintain or adjust the characteristic(s). For instance, a heating element may be activated in order to maintain or increase the temperature of the food item, a humidifier/dehumidifier may be activated to increase/decrease the humidity within the food item container and/or the delivery container, or a gyroscope may be activated to maintain or adjust the orientation of the food item within the food item container.

In other embodiments, the sensor data may be transmitted to a device of the deliverer and/or a service provider that received the order on behalf of the restaurant merchant. Provided that the sensor data is provided by the service provider, the service provider may determine current characteristics of the food item, such as a temperature, orientation, etc., of the food item. The service provider may also compare the current characteristic to an ideal or expected characteristic of the food item, which may be provided by the restaurant merchant, the customer, and/or a different source. Based on that comparison, the service provider may send instructions to the food item container and/or the delivery container, where the instructions may cause activation of the component of the food item container and/or the delivery container. For instance, if a food item that is intended to be consumed at a hot temperature is near or has fallen below an ideal consumption temperature, the service provider may instruct the food item container and/or the delivery container to apply heat to the food item.

The delivery container may also include one or more sensors or devices that allow the delivery container to identify food item containers that enter, and/or are within, the delivery container. For instance, each food item container may include some type of identifier, such as the food item container being associated with a particular color or pattern, one or more characters (e.g., any combination of letters, numbers, symbols, etc.), an image, a barcode, a Quick Response (QR) code, a Radio-Frequency Identification (RFID) sticker/chip, or any other identifier that allows the food item containers to be uniquely identified from one another. Provided that identification data (e.g., the identifiers) are sent to the service provider, the service provider may, by utilizing the identification data, determine which food item containers enter that particular delivery container and/or determine which food item containers are currently included within the delivery container. As a result, the service provider may determine which food items are currently within a particular delivery container, which may allow the service provider to determine whether an order for one or more food items is accurate and complete.

FIG. 1 illustrates an example system 100 for maintaining and/or adjusting characteristics of one or more food items contained within a food item container, possibly while the food item container is being transported to a delivery location of a customer that placed an order for the food item(s). As shown in FIG. 1, the system 100 may include a service provider 102, a content server 104 associated with the service provider 102, one or more merchants 106, merchant devices 108 associated with the one or more merchants 106, one or more deliverers 110, deliverer devices 112 associated with the one or more deliverers 110, one or more customers 114, and customer devices 116 associated with the customers 114. The content server(s) 104, the merchant devices 108, the deliverer devices 112, and/or the customer devices 116 may communicate via one or more networks 118. As shown herein, the content server(s) 104 may include one or more processors 120, computer-readable media 122 (abbreviated as "CRM" in FIG. 1), and one or more modules 124.

In various embodiments, the service provider 102 may offer items (e.g., products, services, food items 126, etc.) to customers 114 via an electronic marketplace (e.g., a website, a mobile application, etc.) associated with the service provider 102. That is, the customers 114 may access the electronic marketplace via corresponding customer devices 116 for the purpose of searching for, viewing, selecting, acquiring (e.g., purchasing, leasing, renting, borrowing, lending, etc.), etc., items. The items, such as the food items 126, may be provided directly by the service provider 102, or may be provided by the service provider 102 on behalf of a different entity, such as the merchants 106 (e.g., restaurants). That is, via a website, an electronic marketplace, and/or a mobile application associated with the service provider 102, the customers 114 may place orders for food items 126 to be provided by the merchants 106. Alternatively, customers 114 may place orders directly with the merchants 106, such as via a merchant website, a mobile application associated with a merchant 106, etc. Although the disclosure describes that an order 128 for a food item 126 may be received by the service provider 102 and/or a merchant 106, it is contemplated that an order 128 need not be associated with a food item 126 that is prepared for, and provided to, a customer 114.

For the purpose of this discussion, the service provider 102 may be any entity, server(s), platform, etc., that offers items (e.g., products, services, food items 126, etc.) for acquisition to consumers. For example, the service provider 102 may be associated with an electronic or merchant marketplace (e.g., a website) that allows customers 114 to search, browse, view and/or acquire (i.e., purchase, rent, lease, borrow, etc.) items, such as food items 126, offered for sale directly by the service provider 102 or offered for sale by the service provider 102 on behalf of merchants 106 and/or other entities. In certain embodiments, a customer 114 may place, via the service provider 102, an order 128 for one or more food items 126 (e.g., food, drinks, etc.) that are to be provided by a restaurant merchant 106. As explained in additional detail below, the service provider 102 may facilitate the delivery of the ordered food items 126 to a physical location (also referred to herein as a "delivery location") associated with the customer 114 that placed the order 128.

The merchants 106 may include any entity that provides items (e.g., food items 126) to the customers 114. The items may be offered for sale, lease, rent, etc., via a physical merchant location (e.g., a brick-and-mortar retail store), via a merchant-branded website (and/or a website associated with the service provider 102 or another entity), or via a mobile application that resides on the customer devices 116. In some embodiments, a merchant 106 may correspond to a merchant 106 that need not be situated in a fixed location, and instead may move from a first physical location to a second physical location. For instance, a merchant 106 may be a food truck, a food cart (e.g., a hot dog or ice cream cart/vendor), or any other type of merchant 106 that offers food items 126 at different physical locations at different times. The merchant 106 may provide dine-in services at a physical location at which the merchant 106 is currently situated, take-out services where customers 114 order food items 126, via the merchant 106 or the service provider 102, and pick up the ordered food items 126 at the current physical location of the merchant 106, and/or delivery services where the merchant 106, the service provider 102, or the deliverer(s) 110 deliver the ordered food items 126 to a physical location associated with a customer 114 (e.g., a residence, a workplace, etc.) that placed the order 128 for the food items 126. Moreover, the merchants 106 may be any type of merchant 106 that offers any type of items (e.g., products, services, etc.), such as a grocery store that offers food items 126, a florist that offers flowers, etc. Each merchant 106 may have one or more associated merchant devices 108. In some embodiments, a merchant 106 may be associated with multiple merchant devices 108 such that individual employees or representatives of the merchant 106 may operate a merchant device 108 (e.g., hand held device, tablet, terminal, a point-of-sale (POS) system/device/terminal, a device to receive payment, etc.).

Upon preparing a food item 126 for take-out or delivery, a restaurant merchant 106 may place the food item 126 in a food item container 132. For the purposes of this discussion, the food item container 132 may be any type of container (e.g., a box, a bag, a carton, a plate, a bowl, ajar, etc.) that the food item 126 is placed into by the restaurant merchant 106, or another entity/individual. That is, the food item container 132 may be any container in which the contents of the food items 126 are in contact with, or are exposed to, an interior surface (e.g., a bottom surface, a side surface or wall, a top surface, a cover, etc.) of the container. The food item container 132 may be made of any type of material, including plastic, cardboard, metal, Styrofoam, and so on. Moreover, the food item container 132 may include a single compartment or multiple compartments. In the latter scenario, the food item container 132 may contain any number of compartments, where each different compartment may include a different food item 126 or ingredient. For instance, the food item container 132 may include a first compartment that contains chicken, a second compartment that contains rice, a third compartment that contains salad, and so on. Moreover, food items 126 included within each food item container 132 may be intended to be picked up by, or delivered to, a single customer 114 or delivery location.

As stated above, as food items 126 are prepared and completed by a merchant 106, the merchant 106 may place the finished food items 126 (or ingredients) into a food item container 132. A deliverer 110 may pick up a food item container 132 that contains the ordered food items 126 from a physical location of the merchant 106 that prepared the food items 126. The deliverer 110 may then physically deliver the ordered food items 126 to a delivery location associated with the customer 114 (e.g., a residence, a workplace, etc.) that placed the order 128 for the food items 126. The deliverer 110 may be a third party, or may be an individual associated with the service provider 102 and/or the merchant 106. The deliverer 110 that is selected to deliver the ordered food items 126 to the customer 114 may be based on a current location of the deliverer 110, an availability of the deliverer 110, a distance between the current location of the deliverer 110 and the current location of the merchant 106, weather conditions (e.g., rain, snow, etc.), traffic conditions, one or more routes that the deliverer 110 could use to travel to the merchant 106 and/or the delivery location of the customer 114, a mode of transportation of the deliverer 110 (e.g., walk, bicycle, car, UAV, etc.), and so on. The deliverer 110 may deliver the food items 126 using any mode of transportation, such as by delivering the food items 126 on foot (e.g., walking, running, skateboarding, etc.), or by using a bicycle or manual scooter, an automobile (e.g., electronic scooter/moped, motorcycle, car, etc.), a bus, a train, and so on. In addition, the deliverer(s) 110 may include unmanned aerial vehicles (UAV) that deliver the food items 126 to a physical location associated with the customer 114. Each deliverer 110 may be associated with a corresponding deliverer device 112, such as a laptop computer, a mobile telephone, a tablet computer, etc. Via the deliverer device 112, and possibly via a mobile application that resides on the deliverer device 112 and that is associated with the service provider 102, the deliverer 110 may receive/send various types of information regarding the pick-up and delivery of food items 126, as will be discussed in additional detail herein.

When picking up one or more food item containers 132 that each contain one or more food items 126, the deliverer 110 may place the food item container(s) 132 into a delivery container 134. For the purposes of this discussion, the delivery container 134 may be used to transport the food item container(s) 132 that contain the ordered food item(s) 126 to the delivery location of the customer 114. The delivery container 134 may also be used to hold/maintain the food item containers 132 for any period of time. In some embodiments, the delivery container 134 may be any type of transport vehicle/vessel in which one or more food item containers 132 are placed into for delivery/take-out. For instance, the delivery container 134 may be a box, bag, envelope, package, tote, or any other mechanism in which the food item containers 132 may be placed within (e.g., on, underneath, etc.) for delivery to, or take-out by, the customer 114. The delivery container 134 may include/transport one or multiple food item containers 132, and may include a single compartment or multiple compartments that are each configured to store/contain one or more food item containers 132. As will be described in additional detail herein, the food item container 132 and/or the delivery container 134 may include one or more sensors, one or more food item characteristic components, and one or more communication components.

In some embodiments, the food item containers 132 and/or the delivery containers 134 may be fungible or disposable, meaning that they are likely thrown away or recycled after one or more uses. Examples of disposable containers may include cardboard/Styrofoam/plastic boxes, paper/plastic bags, and so on. However, in other embodiments, the food item containers 132 and/or the delivery containers 134 may be reusable, and possibly purchased/rented by the merchants 106, the deliverers 110, and/or the customers 114. Reusable containers may be made of plastic, metal, glass, clay, cloth/fabric, or any other material, and may include some or all of the components described above (e.g., sensors, communication components, food item characteristic regulation components, etc.).

Moreover, the customers 114 may include any person or entity that interacts with the service provider 102 for the purpose of ordering, acquiring, purchasing, etc., food items 126 directly from the merchants 106, and/or from the service provider 102 on behalf of the merchants 106. The customers 114 may include in-store customers 114 that purchase or consume the food items 126 provided by the merchants 106 at the current physical location of the merchants 106, and remote customers 114 that also order food items 126 from the merchants 106 via the service provider 102, but that either pick up the food items 126 from the current physical location of the merchants 106 or have the food items 126 be delivered to a physical location associated with the customers 114. The customers 114 may interact with the service provider 102 and/or the merchants 106 via corresponding customer devices 116, which may include cellular telephones, tablet devices, laptop computers, desktop computers, gaming consoles, electronic book (eBook) reader devices, and so on. In some embodiments, as opposed to the customer 114 being an individual person, the customer 114 may correspond to an entity or group, such as a company, a corporation, an educational institution, a non-profit entity, a religious institution (e.g., a church), an athletic team, and so on.

The network(s) 118 may facilitate communications and/or interactions between the content server(s) 104 of the service provider 102, the merchant devices 108, the deliverer devices 112, and/or the customer devices 116. The network(s) 118 may facilitate such communications/interactions via any type of network, such as a public wide-area-network (WAN) (e.g., the Internet), which may utilize various different technologies including wired and wireless technologies. Moreover, the content servers 104 may contain any number of servers that are possibly arranged as a server farm. Other server architectures may also be used to implement the content servers 104.

Moreover, the content server(s) 104, the merchant device(s) 108, the deliverer device(s) 112, and/or the customer device(s) 116 may include one or more processors 120, computer-readable media 122, which is indicated in FIG. 1 as "CRM", and one or more modules 124. The processor(s) 120 may execute the one or more modules 124 and/or processes to cause the content server(s) 104, the merchant device(s) 108, the deliverer device(s) 112, and/or the customer device(s) 116 to perform a variety of functions, as set forth above and explained in further detail in the following disclosure. In some embodiments, the processor(s) 120 may include a central processing unit (CPU), a graphics processing unit (GPU), both CPU and GPU, or other processing units or components known in the art. Additionally, each of the processor(s) 120 may possess its own local memory, which also may store program modules, program data, and/or one or more operating systems.

The computer-readable media 122 may include volatile memory (such as RAM), non-volatile memory (such as ROM, flash memory, miniature hard drive, memory card, or the like), or some combination thereof. The computer-readable media 122 may be non-transitory computer-readable media 122. The computer-readable media 122 may include, or be associated with the one or more modules 124 that perform various operations associated with the content server(s) 104, the merchant device(s) 108, the deliverer device(s) 112, and/or the customer device(s) 116. In some embodiments, the one or more modules 124 may include or be associated with computer-executable instructions that are stored by the computer-readable media 122 and that are executable by the processor(s) 120 to perform such operations. The content server(s) 104, the merchant device(s) 108, the deliverer device(s) 112, and/or the customer device(s) 116 may also include additional components not listed above that may perform any function associated with the content server(s) 104, the merchant device(s) 108, the deliverer device(s) 112, and/or the customer device(s) 116.

The customers 114 may place orders 128 for food items 126 to be provided/prepared by one or more merchants 106 via the service provider 102 (or via the merchant 106 itself), such as via a website or mobile application associated with the service provider 102, a text message, an e-mail message, and so on. In other embodiments, the customers 114 may place orders 128 for food items 126 to be provided/prepared by the service provider 102 itself. Upon receiving an order 128 from a customer 114, the service provider 102 may provide order data 130 relating to the order 128 to the merchant 106 that is to provide the ordered food items 126. For instance, the order data 130 may be provided to a merchant device 108 (e.g., a tablet computer, a POS system, etc.) of the merchant 106. The order data 130 for an order 128 may allow the merchant 106 to fulfill the order 128, such as by the merchant 106 preparing the food items 126 for pick-up by the customer 114 or for delivery to the customer 114 via one or more deliverers 110. The order data 130 may indicate the specific food item(s) 126 included in the order 128, a price/cost of each food item 126 in the order 128, a total cost/price of the order 128, ingredients/supplies needed to provide/prepare the food item(s) 126, an identity of the customer 114 that placed the order 128, an expected delivery time, and any other information that relates to fulfilling the order 128. For a delivery order 128, the order data 130 may indicate a time at which the food items 126 are to be picked up by a deliverer 110 that is to deliver the food items 126 to the customer 114 and/or an identity of that deliverer 110.

As is described in additional detail herein, the food item container 132 that contains the ordered food item 126 and/or the delivery container 134 that is utilized to transport or otherwise contain the food item container(s) 132 may include one or more sensors. The sensor(s) may actively or passively monitor characteristics (e.g., temperature, pressure, humidity, viscosity, orientation, etc.) of the food items 126, and/or conditions within the food item container 132 and/or the delivery container 134, as the food item(s) 126 are being transported to the delivery location. For instance, the sensor(s) may obtain temperature data, pressure data, humidity data, viscosity data, orientation/acceleration data, or any other data that indicates the condition of the food item(s) 126. The sensors may collect such data at different times while the food item container 132 is included within the delivery container 134. The current conditions/characteristics of the food item(s) 126 may be referred to herein as sensor data 136. A communication component of the food item container 132 and/or the delivery container 134 may provide the sensor data 136 to the content server(s) 104 of the service provider 102. In other embodiments, the sensor data 136 may be transmitted between the food item container 132 and the delivery container 134, or the sensor data 136 may be provided to the deliverer device 112 of the deliverer 110 that is currently delivering the food item(s) 126. In the latter example, the sensor data 136 may be provided to a mobile application that resides on the deliverer device 112 and that is associated with the service provider 102.

As will be described in additional detail herein, the service provider 102, the food item container 132, the delivery container 134, and/or the deliverer device 112 may analyze the sensor data 136 to determine the condition/characteristics (e.g., temperature, humidity, orientation, etc.) of the food item(s) 126 being transported by the deliverer 110. For instance, the sensor data 136 may indicate that the food item(s) 126 have cooled or warmed to a temperature that is not acceptable to the service provider 102, the merchant 106, and/or the customer 114. In other embodiments, the sensor data 136 may indicate that the food item(s) 126 may have been damaged or spilled due to a change in orientation or acceleration. Based on the sensor data 136, the service provider 102 may send food item instructions 138 to the food item container 132 and/or the delivery container 134. The food item instructions 138 may cause a component of the food item container 132 and/or the delivery container 134 to apply heat to the food item(s) 126 (e.g., via a heating coil, a microwave, etc.), activate a humidifier/dehumidifier in order to increase/decrease a moisture level of the food item(s) 126, activate a gyroscope to maintain/adjust the orientation of the food item(s) 126, and so on. In some scenarios, food item instructions 138 may be provided to the deliverer device 112, where the food item instructions 138 may instruct the deliverer 110 to inspect the condition of the food item(s) 126 and confirm/verify their condition to the service provider 102 prior to delivery of the food item(s) 126 to the customer 114.

Accordingly, since the food item containers 132 and/or the delivery containers 134 described herein are configured to maintain and/or adjust the characteristics of food items 126 during delivery, the food item containers 132 and/or the delivery containers 134 are able to extend the amount of time that food items 126 will remain in an ideal/acceptable condition for consumption. For instance, the food item containers 132 and/or the delivery containers 134 may cause the food items 126 to maintain their current state (e.g., temperature, humidity, etc.), may adjust characteristics of the food items 126 so that the food items 126 are in their ideal/acceptable consumption condition, or may warm/cool or cook the food items 126 during delivery. As a result, the time in which the food items 126 are in their idea/acceptable consumption state may be lengthened, thereby increasing the likelihood that the food items 126 will be delivered in an acceptable state for the customer 114. Moreover, since the food items 126 may be maintained in their ideal/acceptable consumption state for longer periods of time, the service provider 102 may use the food item containers 132/delivery containers 134 to allow for the delivery of food items 126 to customer locations that it would have not been able to service otherwise. For instance, if the service provider 102 is typically not able to deliver food items 126 to a customer location a certain distance from the merchant location, use of the food item containers 132 and/or the delivery containers 134 may allow for the delivery of food items 126 to that customer location while maintaining the food items 126 in their ideal/acceptable state.

As stated above, the food item containers 132 and/or the delivery containers 134 may include one or more sensors, communication components for transmitting sensor data obtained/detected by the sensor(s), and/or one or more food item characteristic regulation components that are configured to adjust characteristics of the food items 126 included within the food item containers 132. That is, such components may be configured to maintain or adjust characteristics (e.g., temperature, humidity, pressure, etc.) within the food item containers 132 and/or within the delivery containers 134. In some instances, only the food item containers 132 may be more sophisticated, meaning that the food item containers 132 may include one or more of sensors, communication components, or the food item characteristic regulation components. The delivery containers 134 would then be unsophisticated (e.g., a paper or fabric bag, a cardboard box, etc.) and would merely transport the food item containers 132 to the delivery location associated with the customer 114 that placed the order 128. In other embodiments, only the delivery containers 134 would include the sensor(s), communication component(s), and/or the food item characteristic regulation component(s), and the food item containers 132 would be unsophisticated and would merely contain the food items 126 (e.g., a Styrofoam box, a plastic container, etc.). Here, the delivery container 134 could transport any type of container—sophisticated or unsophisticated. In an additional embodiment, both the food item container(s) 132 and the delivery container 134 could have various degrees of sophistication, meaning that each could include sensor(s), communication component(s), and/ or food item characteristic regulation component(s). In any of the above scenarios, the food item containers 132, the delivery containers 134, the content server(s) 104, the merchant devices 108, the deliverer devices 112, and/or the customer devices 116 could exchange communications with one another.

Figure 2:
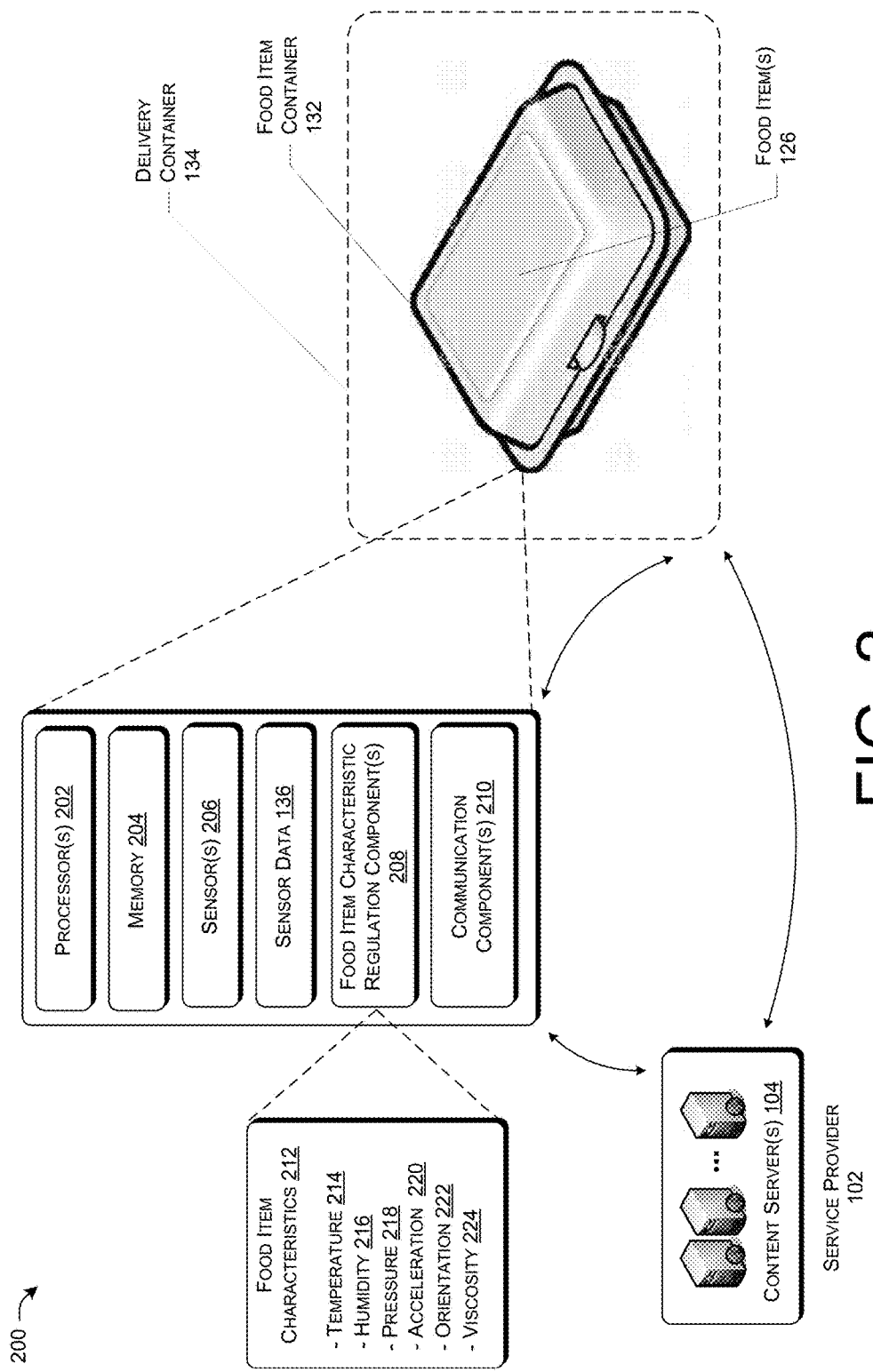
FIG. 2 illustrates an example system for maintaining and/or adjusting characteristics of a food item during delivery using a food item container.

FIG. 2 illustrates an example system 200 for maintaining and/or adjusting the characteristics of food items using a food item container and/or a delivery container. More particularly, the system 200 may include a food item container 132 that contains one or more food items 126, a delivery container 134 that may contain and/or transport the food item container 132, and the content server(s) 104 associated with the service provider 102. In the embodiment illustrated in FIG. 2, the food item container 132 may include one or more processors 202, memory 204, one or more sensors 206, sensor data 126 obtained/detected by the sensor(s) 206, one or more food item characteristic regulation components 208, and one or more communication components 210. Although the food item container 132 is illustrated as containing such components, it should be appreciated that the delivery container 134 may also include the components described above. For the purposes of FIG. 2, the components illustrated therein will be in reference to the food item container 132.

As set forth above with respect to FIG. 1, food items 126 that are ordered by a customer 114 for delivery or take-out (via the service provider 102 or a merchant 106), and that are prepared/provided by the merchant 106 (e.g., a restaurant merchant 106), may be placed in a food item container 132 for delivery to the customer 114. Provided that a deliverer 110 is to physically deliver the food item(s) 126 to a delivery location associated with the customer 114, the deliverer 110 may place the food item container(s) 132 into a delivery container 134 for transport. The delivery container 134 may be stored at the merchant 106 or may be brought by the deliverer 110. Once the food item container(s) 132 are placed in the delivery container 134, the deliverer 110 may transport the food items 126 to the customer 114 in any manner.

As shown, the food item container 132 may include one or more processor(s) 202. The one or more processors 202 may be similar to, or different from, the processors 120 previously discussed with respect to the content server(s) 104, the merchant devices 108, the deliverer devices 112, and the customer devices 116. The food item container 132 may also include memory 204 that is configured to store the sensor data 136 obtained by and received from the one or more sensors 206. Although not shown, the food item container 132 (as well as the delivery container 134) may include a power source, such as a battery (rechargeable or one-time use) or a plug/outlet, that provides power to the food item container 132.

The food item container 132 may also include one or more sensors 206 that passively or actively monitor conditions/characteristics within the food item container 132. Data detected, obtained, and/or collected by the sensor(s) 206 may be referred to herein as the sensor data 136. The food item container 132 may transmit, using the communication component(s) 210, the sensor data 136 to a different device, such as the content server(s) 104. However, in other embodiments, the processor(s) 202 of the food item container 132 may aggregate, process, and/or analyze the raw sensor data 136 prior to transmitting the sensor data 136. The memory 204 of the food item container 132 may store the sensor data 136 prior to the sensor data 136 is analyzed/transmitted, and afterwards.

The sensor(s) 206 of the food item container 132 may continually detect/obtain sensor data 136 starting at a first time at which the food items 126 are placed within the food item container 132 and, once the food item container(s) 132 are placed within the delivery container 134, during delivery of the food items 126 to the delivery location of the customer 114. The sensor data 136 may be time-stamped to indicate times in which individual values of the sensor data 136 were obtained. The food item container 132 may include multiple sensors 206, where each sensor 206 is placed in a different location within the food item container 132. For instance, a first sensor 206 may be located within or on the food item container 132 itself, such as being affixed to an interior surface and/or an exterior surface of the food item container 132. A second sensor 206 may be placed in close proximity to the food items 126, such as being in contact with the food items 126. As a result, the sensor data 136 may consist of multiple data points that vary based on the time in which they were obtained, the respective locations of the sensors 206 the data points were obtained from, and the type of data obtained (e.g., temperature data, orientation data, humidity data, pressure data, acceleration/velocity data, etc.).

As stated above, the sensor(s) 206 of the food item container 132 may situated in different locations, such as within the food item container 132 (e.g., on an interior surface of the food item container 132, in contact with the food item 126 itself, etc.). The sensor(s) 206 may also be aggregated in a single location (e.g., within a single device), where the sensor(s) 206 may be placed on an interior or exterior surface of the food item container 132. In either scenario, the food item container 132 may include any type and number of sensors 206. If multiple sensors 206 are distributed throughout the food item container 132, the sensor(s) 206 may be physically connected to one another or to a different component of the food item container 132 (via a wire). For instance the sensor(s) 206 may be coupled to the processor(s) 202, the memory 204, the food item characteristic regulation component(s) 208, and/or the communication component(s) 210 of the food item container 132, or may be physically coupled to the delivery container 134. The sensors 206 may not be physically coupled to a different component, but may be communicatively coupled to a different component of the food item container 132 (or the delivery container 134) in some manner (e.g., Bluetooth, Wi-Fi, etc.). Accordingly, the food item container 132 may include an array of sensors 206 (e.g., a network of sensors 206). Regardless of the number and location of the sensors 206, the sensors 206 obtain/detect the sensor data 136 that could be analyzed by the food item container 132 and/or sent to the content server(s) 104, the delivery container 134, merchant devices 108, deliverer devices 112, and/or customer devices 116.

The different types of sensors 206 will be discussed with respect to the food item characteristics 212 set forth below. Although a particular type of sensor 206 is not illustrated in FIG. 2, any type of sensor 206 may be associated with the food item container 132. For instance, the sensors 206 may include one or more temperature sensors 206, humidity sensors 206, pressure sensors 206, accelerometers, motion detectors, gyroscopes, etc., to determine the temperature, humidity, pressure, viscosity, velocity, acceleration, motion, vibration, orientation, etc., associated with the food item container 132 and/or the food item(s) 126 that are included within the food item container 132.

In certain embodiments, the sensors 206, the food item characteristic regulation components 208, and/or the communication components 210 may only be included within a food item container 132 when the food items 126 to be delivered are intended to be consumed/delivered at a particular temperature (or range of temperatures), such as being served hot (e.g., hot soup), cold (e.g., an ice cream bar), or at a temperature different than room temperature. Such components may also be included when the food items 126 are to be consumed at a particular moisture level (humidity), pressure, presentation, viscosity, and so on. In other embodiments, the components described above may be included in each food item container 132 that is used to contain the food items 126 that are to be delivered to a customer 114. The sensors 206, the food item characteristic regulation components 208, and/or the communication components 210 may be activated in scenarios where the food items 126 are intended to be consumed and delivered at a particular condition (e.g., temperature, pressure, humidity, etc.), or such components may be deactivated when this is not the case.

Certain food items 126 are intended to be consumed in a particular condition, such as at a certain temperature or temperature range, a particular moisture level, a certain viscosity, etc. For instance, soup may be intended to be served hot, an ice cream bar is intended to be consumed cold/frozen, bread/tortillas are intended to be moist (as opposed to dry) when consumed, a milkshake is intended to be consumed in a semi-frozen state, a salad is intended to be consumed when crisp, and so on. Moreover, certain food items 126 are intended to be presented in a certain manner. For example, a hamburger is intended to be served and consumed in an upright orientation with the contents of the hamburger (e.g., the patty, lettuce, tomatoes, etc.) included within the two halves of the bun. A customer 114 would likely be displeased if the contents of the hamburger were strewn around within the food item container 132. As a result, the food item container 132 (and/or the delivery container 134) may include one or more food item characteristic regulation components 208 that maintain and/or adjust one or more food item characteristics 212 of the food items 126. As shown in FIG. 2, although any number of food item characteristics 212 associated with food items 126 may exist, the food item characteristics 212 may include temperature 214, humidity 216, pressure 218, acceleration 220, orientation 222, and viscosity 224.

In some embodiments, the food item characteristic regulation components 208 may include one or more components that are configured to maintain and/or adjust the temperature 214 associated with the food item container 132. The temperature 214 may correspond the temperature 214 of the food item(s) 126 included within the food item container 132, the temperature 214 within the food item container 132, and/or the temperature 214 on an exterior surface of the food item container 132. With respect to adjusting the temperature 214, the food item characteristic regulation component(s) 208 may warm, cool, thaw, cure, or fully/partially cook the food items 126 included within the food item container 132.

In order to determine the temperature 214 associated with the food item(s) 126 and/or the food item container 132, the sensor(s) 206 of the food item container 132 may include a standard thermometer, an infrared thermometer, and/or a temperature probe. Such temperature sensors 206 may be positioned on, or affixed (either permanently or detachably) to, an exterior surface of the food item container 132 and/or an interior surface of the food item container 132. The temperature sensor 206 may also pierce a surface (e.g., a top surface, a side surface, a bottom surface, etc.) of the food item container 132 such that portions of the temperature sensor 206 are both within and outside the food item container 132. In other embodiments, the temperature sensor 206 may be in close proximity to the food item(s) 126 contained within the food item container 132, such as being in physical contact with the food item(s) 126. The sensor data 136 obtained by the temperature sensors 206 may include data points/values that indicate various temperatures 214 values associated with the food item(s) 126 and/or the food item container 132 at different times. The temperature sensor data 136 may be obtained and aggregated over time while the food items 126 are included within the food item container 132.

The temperature 214 associated with the food item(s) 126 within the food item container 132 and/or the food item container 132 itself may be maintained and/or adjusted using any type of food item characteristic regulation components 208. For instance, the temperature 214 may be maintained/adjusted using the process of induction. For instance, the food item characteristic regulation component(s) 208 may produce an electric or magnetic state arising due to the proximity (without contact) of an electrified or magnetized body, such as by producing an electric current in a conductor (e.g., metal) by varying the magnetic field applied to the conductor. In some embodiments, a metal wire may be placed in proximity to (e.g., underneath, wrapped around, adjacent to, etc.) the food item container 132. Provided that a magnetic field is created, the metal wire will apply heat to the food item container 132, thereby possibly maintaining the temperature of a warm/hot food item 126 or increasing the temperature of that food item 126. In other embodiments, the existence of a magnetic field, possibly due to the presence of one or more magnets, may cool the food item(s) 126 and/or the food item container 132.

In other embodiments, the food item characteristic regulation components 208 may apply heat to the food item(s) 126 and/or the food item container 132 using a stove top, grill, or a hot plate. For instance, the food item container 132 may rest on, or be situated in proximity to a stove top, grill, or hot plate. When the stove top/hot plate is activated, heat may be applied to the food item container 132, thereby maintaining or increasing the temperature 214 of the food item(s) 126 (e.g., heating up, cooking, etc.). Although examples of specific modes of heat transfer are described herein, it is contemplated that any mode of heat transfer may be used to maintain or adjust the temperature of the food item(s) 126, the environment within the food item container 132, and/or the environment within the delivery container 134. For the purposes of this discussion, modes of heat transfer may include conduction, convection, and radiation.

The food item characteristic regulation component(s) 208 of the food item container 132 and/or the delivery container 134 may additionally include a mechanism that serves as a barrier or layer between the interior of the food item container 132/delivery container 134 and an exterior of the food item container 132/delivery container 134. Such mechanisms may include any type of insulation, such as thermal insulation, that helps maintain the temperature within the interior of the food item container 132/delivery container 134. The insulation may be of any type of material, such as Styrofoam, polyethylene, polypropylene, urethane (or polyurethane), silicone, expanded polystyrene (EPS), and so on. Such insulation may assist in causing hot/warm food items 126 (e.g., hot soup) to remain hot/warm within the food item container 132/delivery container 134. However, the insulation may also assist in causing cold food items 126 (e.g., ice cream) to remain cool/cold/frozen within the food item container 132/delivery container 134. Moreover, the mechanisms may include a vapor barrier or seal that prevents solids, liquids, and/or gases (e.g., the food items 126, air, moisture, etc.) from entering or leaving the interior of the food item container 132/delivery container 134. Such a vapor barrier/seal may allow food items 126 to remain hot/cold, moist/dry, and so on.

The food item characteristic regulation component(s) 208 may also include a mechanism that combines one or more substances (e.g., chemicals) for the purpose of applying heat or cold to the food item container 132. For instance, a heat pack that contains multiple chemicals (e.g., iron powder, salt, vermiculite, sawdust, charcoal, etc.) may be applied to the food item container 132 in order to heat the food item(s) 126 included within the food item container 132. Heat or cold may be applied to the food item container 132 as a result of mixing water with a combination of chemicals, such as, for example, ammonium nitrate, calcium chloride, sodium chloride, sodium acetate, and ammonium chloride.

In other embodiments, the food item characteristic regulation component(s) 208 may include a mechanism that applies liquid (e.g., water) of a particular temperature to the food item container 132 in order to maintain the temperature 214 of the food item(s) 126, or to heat/cool the food items 126. For instance, a water reservoir (e.g., bag, pouch, etc.) may be placed in close proximity to an exterior surface of the food item container 132, such as the water reservoir being placed underneath or on top of the food item container 132. Moreover, the food item container 132 may be immersed in a liquid in order to maintain, increase, or decrease the temperature 214 of the food item(s) 126 included within the food item container 132. For instance, the food item container 132 (or just the food items 126) may be placed in a sous-vide bag such that the food item container 132/food item(s) 126 are within a vacuum-sealed pouch, which may be made of plastic or any other material.

The food item characteristic regulation component(s) 208 may include a microwave that increases the temperature 214 of, or cooks/thaws, the food item(s) 126 included within the food item container 132. The food item(s) 126 may be heated/cooked as a result of exposing the food item(s) 126 to microwave radiation in the electromagnetic spectrum. In other embodiments, the food items 126 may be heated/cooked using pressure. For instance, the food item characteristic regulation component(s) 208 may include a pressure cooker that heats/cooks the food item(s) 126, using water or a different cooking liquid, in a sealed vessel. In this example, when activated, the liquid within the pressure cooker is heated to a boiling temperature and the resulting trapped steam increases the internal pressure, thereby allowing the temperature within the pressure cooker to rise.

In additional embodiments, the food item characteristic regulation component(s) 208 may immerse the food item(s) 126 and/or the food item container 132 with hot air or steam in order to maintain or increase the temperature 214 of the food item(s) 126. For instance, the food item characteristic regulation component(s) 208 may inject hot air or steam within the delivery container 134 and/or within the food item container 132, such as through a small opening in a surface of the food item container 132. In other embodiments, the food item characteristic regulation component(s) 208 may also maintain or increase the temperature 214 of the food item(s) 126 using a laser or radioactive material.

The food item characteristic regulation component(s) 208 may also cause the food item(s) 126 and/or the food item container 132 to be cooled using refrigeration, which may be referred to herein as the process of moving heat from one location to another location in controlled conditions. One or more refrigerants, Freon, ice, dry ice, or other cooling agents may also be used to maintain or reduce the temperature 214 of the food item(s) 126 and/or the food item container 132. For the purpose of this discussion, a refrigerant may correspond to a substance or mixture (e.g., a fluid) that typically undergoes phase transitions from a liquid to a gas, and back again.

In addition to temperature 214, the food item characteristic regulation component(s) 208 may maintain and/or adjust the humidity 216 (e.g., the amount of water vapor in the air) within the food item container 132. The humidity levels within the food item container 132 may be determined using any type of sensor 206, such as a humidity sensor 206. The humidity sensor(s) 206 may be within the food item container 132, such as being positioned on (e.g., affixed to, attached to, etc.) an interior surface of the food item container 132, or external to the food item container 132, such as being positioned on an exterior surface of the food item container 132. In other embodiments, the humidity sensor(s) 206 may poke through a surface of the food item container 132 such that portions of the humidity sensor(s) 206 are both within and outside of the food item container 132. In some instances, the opening in which the humidity sensor 206 is inserted though the food item container 132 may be sealed on the inside and/or outside of the food item container 132. The humidity sensor(s) 206 may be within the delivery container 134, and when the food item container 132 is placed in the delivery container 134, the humidity sensor(s) 206 may pierce through a surface/wall of the food item container 132. When the food item container 132 is removed from the delivery container 134, the humidity sensor(s) 206 may remain with the delivery container 134. Moreover, when the humidity sensor(s) 206 are inserted within or removed from the food item container 132, a seal may be created such that air, moisture, liquid, portions of the food item(s) 126, etc., do not enter or leave the food item container 132. Although discussed with respect to humidity sensors 206, it is appreciated that any type of sensor 206 may pierce a surface/wall of the food item container 132, as discussed above.

In various embodiments, the food item characteristic regulation component(s) 208 may maintain and/or adjust the humidity 216 (e.g., the moisture level) within the food item container 132. Certain food items 126 are intended to be consumed when moist (e.g., bread, tortillas, etc.) and are less appealing when the food items 126 become dry. In order to maintain the moistness of such food items 126, the food item characteristic regulation component(s) 208 may maintain the humidity 216 within the food item container 132, or even increase the humidity 216 level within the food item container 132 if it is determined that the food item(s) 126 are becoming dry (e.g., drying out). Other food items 126 are intended to be consumed when crisp (e.g., tortilla chips), and may become soggy or soft when exposed to higher humidity 216 levels. As a result, it may be desired to keep the humidity 216 level within the food item container 132 relatively low.

In order to maintain or adjust the humidity 216 levels within the food item container 132, the food item characteristic regulation component(s) 208 may include a humidifier that increases/maintains the humidity 216 level within the food item container 132 or a dehumidifier that decreases/maintains the humidity 216 level within the food item container 132. In other embodiments, the food item characteristic regulation component(s) 208 may include a valve that releases moisture (e.g., steam, water droplets) into the food item container 132 to increase/maintain the humidity 216 level. The valve may also extract moisture from the food item container 132 in order to decrease/maintain the current humidity 216 level within the food item container 132. The food item characteristic regulation component(s) 208 may also include an air conditioning system or fan that blows air onto the food items 126, which may decrease the humidity 216 level within the food item container 132 and which may cause the food item(s) 126 to become more dry (or avoid being moist). The food item container 132 may include one or more holes or valves that open/close in order to maintain/regulate the humidity 216 level within the food item container 132.

The food item characteristic regulation component(s) 208 may include some type of substance that is included within the food item container 132 in order to maintain and/or adjust the corresponding humidity 216 level. For instance, a wet or damp sponge may be affixed to an interior surface of the food item container 132 so that the humidity 216 level within the food item container 132 is maintained or increased. On the other hand, a substance (e.g., a dry sponge, bread, rice, a silicon packet/package, etc.) may be included within the food item container 132 in order to maintain or decrease the humidity 216 level within the food item container 132. Such substances may absorb water/moisture in the air in order to maintain/decrease the humidity 216 level within the food item container 132.

An additional food item characteristic 212 may include pressure 218, which may be maintained and/or adjusted by the food item characteristic regulation component(s) 208 of the food item container 132. Maintaining and/or adjusting the pressure 218 within the food item container 132 may cause food items 126 to cook (and to cook more/less quickly), may cause fully/partially frozen food items 126 to thaw to a desired condition/state, or may cause food items 126 to remain at an intended condition or temperature. The pressure 218 level within the food item container 132 may be obtained/detected by the sensor(s) 206 of the food item container 132, which may include a pressure sensor 206. In other embodiments, the pressure 218 level within the food item container 132 may be monitored by knowing the volume within the food item container 132 and determining the temperature 214 within the food item container 132 (e.g., Boyle's Law). In order to maintain/adjust the pressure 218 within the food item container 132, the food item characteristic regulation component(s) 208 may either increase/decrease/maintain the temperature 214 within the food item container 132 using the techniques described above, or increase/decrease/maintain the volume within the food item container 132, such as by injecting/extracting gas (e.g., air) into/from the food item container 132. As stated above, varying the temperature 214 and/or volume within the food item container 132 may adjust the pressure 218 within the food item container 132. In other embodiments, the food item characteristic regulation component(s) 208 may include a pressure cooker that the food items 126 are placed into. The pressure cooker may maintain/adjust the pressure 218 in order to thaw/cook the food items 126, and vary the rate at which the food items 126 are thawed/cooked.

In various embodiments, the sensor(s) 206 may also include an accelerometer that determines acceleration data, which may indicate a change in acceleration 220 associated with the food item container 132. The sensor(s) 206 may also include a motion sensor 206 that detects the motion/movement (or change in motion) of the food item container 132 and the corresponding food item(s) 126. More particularly, based on acceleration or velocity data detected by the sensor(s) 206, an amount of change in acceleration/velocity experienced by the food item(s) 126 may be determined. Changes in acceleration/velocity may be caused by the deliverer 110 starting, stopping, or turning a vehicle in a sudden manner, the deliverer 110 mishandling or dropping the food item container 132 and/or the delivery container 134, and so on. If the change in acceleration/velocity exceeds an acceleration/velocity threshold for the food item

126, there may be a risk that the condition and/or presentation of the food item(s) 126 has been compromised. For instance, the food item 126 may have spilled, cracked, broken, shifted, etc.

Accordingly, the food item characteristic regulation component(s) 208 may prevent the effects of a change in velocity/acceleration 220 associated with the food item container 132. For instance, the food item characteristic regulation component(s) 208 may be a gyroscope or other mechanism that allows the food item container 132 to remain stable within the delivery container 134. The food item characteristic regulation component(s) 208 may also allow the food item container 132 to be suspended within the delivery container 134 such that the food item container 132 is impacted to a lesser degree as a result of changes in acceleration or velocity. The food item container 132 may be suspended using netting, string, rope, or any other material that causes the food item container 132 to not be directly adjacent to a surface of the delivery container 134. In other embodiments, the food item characteristic regulation component(s) 208 may include insulation or padding that lessens the degree in which the food item container 132 is impacted by changes in acceleration/velocity. Such materials may include bubble wrap, insulation, pillows, padding, and so on.

In other embodiments, the sensor(s) 206 may detect the orientation 222 of the food item container 132 and the food item(s) 126 included therein. An example of the sensor(s) 206 may be a gyroscope or other type of sensor 206 that provides values indicating a degree or orientation 222, azimuth, pitch, roll, and so on. That is, the orientation sensor(s) 206 may indicate the particular orientation 222 of the food item(s) 126 included within the food item container 132. Moreover, the sensor(s) 126 may include a camera that captures images and/or video of the food item(s) 126 included within the food item container 132. The images/videos may detect whether a change in acceleration/velocity/orientation has affected the aesthetics or presentation of the food item(s) 126. In certain embodiments, certain food items 126 may be associated with an acceleration/velocity/orientation threshold, which may correspond to a particular change in acceleration or a particular angle experienced by the food item(s) 126 (e.g., 20 degrees), or a change in orientation within a particular amount of time. As described herein, if it is determined that the acceleration, motion, and/or orientation thresholds have been exceeded, the deliverer 110 may be instructed to inspect the food item(s) 126 to determine their condition, and the deliverer 110 may be requested to confirm/verify the condition of the food item(s) 126.

The food item characteristic regulation component(s) 208 discussed above with respect to changes in acceleration/velocity (e.g., a gyroscope, suspending the food item container 132, insulation/padding, etc.) may also apply to minimizing the impact of changes in orientation 222.

In additional embodiments, the food item characteristic regulation component(s) 208 may intentionally induce or create a change in velocity/acceleration 220 and/or orientation 222 of the food item(s) 126 included within the food item container 132. The change in velocity/acceleration/orientation may be created in order to cause a specific outcome. For instance, the food item characteristic regulation component(s) 208 may cause the food items 126, or ingredients included within the food items 126, to be rotated, mixed, blended, stirred, and so on. That is, the food item characteristic regulation component(s) 208 may include a blender, a mixer, or other mechanism that rotates, mixes, blends, stirs, shakes, etc., the food items 126 (or ingredients). In some embodiments, certain food items 126 may settle (e.g., soup), so the food item characteristic regulation component(s) 208 may cause the food items 126 to be mixed/stirred. Other food items 126, such as ice cream, may need to be constantly rotated while being prepared. As a result, the food item characteristic regulation component(s) 208 may include a spoon, arm, etc., that is inserted into the food items 126 for the purpose of stirring/rotating the food items 126.

In various embodiments, the food item characteristic regulation component(s) 208 may maintain and/or adjust the viscosity 224 associated with the food item(s) 126 included within the food item container 132. The viscosity 224 of the food items 126 may be determined by the sensor(s) 206 of the food item container 132, which may correspond to a sensor 206 that measures the surface tension of the food item 126 or a camera that captures images/video of the food item(s) 126, where the images/video depict a rate at which the food item(s) 126 moves back and forth during transport/delivery. Provided that the food item 126 is soup, which may be intended to be served/consumed at a particular viscosity 224, the sensor(s) 206 may determine the viscosity 224 of the soup. In order to maintain, increase, or decrease the viscosity 224 (e.g., thickness, density, etc.) of the soup, the food item characteristic regulation component(s) 208 may apply heat/cold to the soup, or may rotate, mix, blend, etc., the soup, as described above.

As referenced above, the food item characteristic regulation component(s) 208 may include a camera that captures images and/or video of the food items 126 within the food item container 132. The images/video of the food items 126 may depict the current condition of the food items 126 as they are being transported for delivery to the customer 114. Based on the images/video, one or more of the food item characteristics 212 may be inferred/determined. For instance, an image/video that depicts cheese on a pizza becoming more solid, as opposed to melted, may indicate that the temperature 214 within the food item container 132 is too low and should be increased. In contrast, if cheese on a pizza that is being warmed/cooked within the food item container 132 is becoming brown (e.g. the cheese may be burning), the temperature 214 within the food item container 132 is likely too hot and should be decreased. And if the images/video depict that the cheese on the pizza appears to be properly melting, the temperature 214 within the food item container 132 should likely be maintained. As another example, assume that the food item 126 is ice cream and that the image/video indicates that the ice cream is melting. This may indicate that the temperature 214 within the food item container 132 is too high and should be decreased.

In other embodiments, the images/video may indicate that a food item 126 is too wet/soggy, which may be determined based on the food item 126 appearing droopy or the presence of water droplets within the food item container 132 (e.g., on the food item 126, on the walls/top of the food item container 132, etc.). As a result, the food item characteristic regulation component(s) 208 may decrease the humidity 216 within the food item container 132. The humidity 216 within the food item container 132 may be increased if the food item 126 appears to be too dry. In other embodiments, the images/video may indicate that the condition/presentation of the food item(s) 126 has been compromised. For instance, the individual food items 126 within the food item container 132 may have mixed, spilled, broke, etc., possibly due to a sudden change in acceleration 220, velocity, and/or orientation 222. The food item container 132 and/or the delivery container 134 may notify the service provider 102 and/or the deliverer device 112 in such a scenario.

Via the communication component(s) 210 of the food item container 132, the food item container 132 may transmit or communicate the sensor data 136 (and any other type of data/information) to one or more of the delivery container 134, the content server(s) 104, the merchant device 108, the deliverer device 112, and the customer device 116. In some embodiments, the sensor data 136 transmitted by the food item container 132 may be the raw, unprocessed sensor data 136 obtained by the sensors 206 of the food item container 132. However, in other embodiments, the food item container 132 may first process/analyze at least a portion of the sensor data 136 before sending the partially/fully processed sensor data 136 to one of the devices set forth above.

Moreover, the communication component(s) 210 of the food item container 132 may provide, send, transmit, etc., the sensor data 136 obtained by the one or more sensors 206 to the delivery container 134, the content server(s) 104, the merchant device 108, the deliverer device 112, and/or the customer device 116 in any manner and using various types of technology. For instance, the communication component(s) 210 may send the sensor data 136 using a Bluetooth or Bluetooth low energy (also referred to Bluetooth LE, BLE, or Bluetooth Smart) connection. Although the sensor data 136 may be transmitted using a Bluetooth or Bluetooth low energy connection, Bluetooth low energy may provide for a reduced amount of power consumption while maintaining a similar communication range as Bluetooth. In order for the communication component(s) 210 of the food item container 132 to send the sensor data 136 obtained by the sensor(s) 206 via a Bluetooth/Bluetooth low energy connection, the food item container 132 may include an appropriate chip, integrated circuit, or specialized hardware/software.

The communication component(s) 210 may also transmit the sensor data 136 using a wireless network, such as Wi-Fi, or a cellular network, such as 3G, 4G, LTE, or any subsequently developed cellular network. Via Wi-Fi technology, the food item container 132 may connect to a wireless local area network (WLAN) in order to transmit the sensor data 136. In this scenario, the communication component(s) 210 may include a chip, circuit, and/or specialized hardware/software that allows the food item container 132 to connect to a wireless network, such as a wireless network associated with a merchant 106, the deliverer 110, and/or the customer 114, or a Wi-Fi hotspot. In other embodiments, the communication component(s) 210 may include a chip, circuit, and/or specialized hardware/software that allows the food item container 132 to connect to a cellular network, as described above. In addition, the food item container 132 may send the sensor data 136 to a different device (e.g., the delivery container 134, the deliverer device 112) via a physical connector, such as a cable. However, regardless of the type of technology or connection used to transmit the sensor data 136, the communication component(s) 210 of the food item container 132 may facilitate the transmittal of the sensor data 136 to the delivery container 134, the deliverer device 112, and/or the content server(s) 104 for subsequent aggregation, storage, and analysis. In some embodiments, the food item container 132 may have multiple types of communication component(s) 210 in case one of the types is unable to transmit the sensor data 136. For instance, if a first communication component(s) 210 (e.g., a cellular connection) is unable to transmit the sensor data 136, a second communication component(s) 210 (e.g., Wi-Fi) may serve as an alternate and instead transmit the sensor data 136.

In certain embodiments, the food item containers 132 and/or the delivery containers 134 may be connected to a device (e.g., a docking station, a port, etc.) that allows the communication component(s) 210 to send the sensor data 136 to any source (e.g., a merchant device 108, a deliverer device 112, the content server(s) 104, etc.). For instance, once the food item(s) 126 are placed in a food item container 132, the food item container 132 (or the delivery container 134 that contains the food item container 132), may be placed in a docking station at the restaurant merchant 106 for pick-up by the deliverer 110. Moreover, upon picking up the food item(s) 126, the deliverer 110 may place the food item container 132 and/or the delivery container 134 in a docking station associated with a vehicle used by the deliverer 110 to transport the food item(s) 126, such as a car, a truck, a UAV, and so on. The communication component(s) 210 may transmit the sensor data 136 (and any other information/data) via a wired or wireless connection.

As stated above, the communication component(s) 210 may transmit the sensor data 136 to, and otherwise communicate with, the content server(s) 104, the merchant device(s) 108, the deliverer device(s) 112, the customer device(s) 116, and/or the delivery container(s) 134. Any one of the foregoing devices, including the food item container(s) 132, may process the sensor data 136 and cause the food item characteristic regulation component(s) 208 of the food item container 132 to maintain and/or adjust any one of the food item characteristics 212 associated with the food item(s) 126. However, for the purpose of the discussion with respect to FIG. 2, the process of receiving the sensor data 136, processing/analyzing the sensor data 136, and/or sending the food item instructions 138 may be performed by the content server(s) 104 associated with the service provider 102. In this scenario, the service provider 102 and/or the content server(s) 104 may serve as a centralized hub that is configured to communicate with the rest of the devices that are illustrated in the figures and that are described herein.

In various embodiments, upon receiving the sensor data 136 from the food item container 132, the delivery container 134, or any other device (e.g., the deliverer device 112), the service provider 102 may process the sensor data 136. In particular, the service provider 102 may aggregate the sensor data 136 and store the aggregated sensor data 136 for subsequent analysis. The aggregated sensor data 136 may be stored in one or more databases, data structures, etc., and may be structured/organized based on the type of sensor data 136 (e.g., temperature data, humidity data, orientation data, acceleration/velocity data, etc.), the time in which the sensor data 136 was obtained by the sensors 206 of the food item container 132/delivery container 134, and/or the particular sensor 206 that obtained/detected the sensor data 136. In other embodiments, the sensor data 136 may be aggregated by the food item container 132, the delivery container 134, and/or the deliverer device 112 and then the aggregated sensor data 136 may be provided to the service provider 102.

In various embodiments, the service provider 102 may determine, based on the sensor data 136, whether the condition, presentation, temperature 214, humidity 216, pressure 218, viscosity 224, etc., associated with the food items 126 being delivered are acceptable for delivery to, and consumption by, the customer 114. That is, the service provider 102 may determine whether the food items 126 included within the food item container 132 are at an appropriate/acceptable temperature 214, humidity 216, pressure 218, and/or viscosity 224, and may ensure that the food items 126 are in suitable condition for the customer 114. Based on the sensor data 136 obtained by the sensor(s) 206 of the food item container 132, the service provider 102 may send the food item instructions 138 to the food item container 132 and/or the delivery container 134. The food item instructions 138 may instruct the food item characteristic regulation component(s) 208 of the food item container 132 and/or the delivery container 134 to maintain or adjust (e.g., increase, decrease, etc.) one or more of the food item characteristics 212 (e.g., temperature 214, humidity 216, pressure 218, etc.), as will be discussed below.

Certain food items 126 are intended to be served and consumed at a particular temperature 214 (or within a range of temperatures 214), at a certain humidity 216 level, at a certain viscosity 224, and so on. Although any food item characteristic 212 illustrated in FIG. 2 may apply, temperature 214 is used herein as an illustrative example. For instance, hot soup may be intended to be served/consumed at around 160 degrees Fahrenheit, or no lower than this temperature. On the contrary, ice cream may be intended to be served/consumed at no greater than 10 degrees Fahrenheit. When delivering food items 126 that are intended to be consumed either at a hot/warm or cold temperature (or any temperature other than room temperature), the service provider 102 may want to ensure that such food items 126 will be delivered at or near those temperatures. To do so, the service provider 102 may determine, for different food items 126, temperature thresholds that are used to determine whether food items 126 are being delivered to customers 114 at an acceptable temperature. The temperature threshold for a particular food item 126 may be a particular temperature (e.g., 160 degrees Fahrenheit for hot soup) or an acceptable range of temperatures (e.g., 0 to 10 degrees Fahrenheit for ice cream). In other embodiments, the temperature threshold may be an amount of temperature change (e.g., increase or decrease) during delivery of the food item 126 beginning at a time at which the food item 126 is placed in the food item container 132. The temperature threshold may also be a percentage of temperature change (e.g., increase or decrease) during delivery of the food item 126 that also begins when the food item 126 is placed within the food item container 132 and/or the delivery container 134. As will be described in additional detail herein, the sensor data 136 obtained by the sensor(s) 206 of the food item container 132 may be used to determine whether a temperature threshold has been exceeded.

The ideal consumption temperature of a particular food item 126 and the corresponding temperature threshold for that food item 126 may be determined in various manners. For instance, the ideal consumption temperature and/or the temperature threshold for a food item 126 may be determined from a cook book, a reference manual, an online source, discussions with experts/chefs, the merchant 106 that prepares/provides the food item 126, and/or the customer 114 that ordered the food item 126. For instance, a merchant 106 may characterize the food item 126 with respect to temperature (e.g., hot food, cold food, etc.), food items 126 that are prone to spilling (e.g., spillable), food items 126 that are susceptible to breakage (e.g., fragile), and so on. The merchant 106 may also specify other food item characteristic 212 that should be maintained during delivery of the food item(s) 126. Moreover, the temperature, or any other food item characteristic 212, of a food item 126 may be specified by the customer 114. For instance, the customer 114 may indicate that he/she prefers his/her soup to be very hot when delivered/consumed. The ideal consumption temperature and/or the temperature threshold for a food item 126 may also be determined using one or more predictive models. Such predictive models may include a group method of data handling, Naïve Bayes, k-nearest neighbor algorithm, majority classifier, support vector machines, random forests, boosted trees, Classification and Regression Trees (CART), neural networks, ordinary least square, regression analysis, and so on. Moreover, the ideal consumption temperature and/or the temperature threshold for a food item 126 may also be determined using one or more machine learning techniques, which may include supervised learning, unsupervised learning, semi-supervised learning, classification analysis, regression analysis, clustering, recognition, etc. Moreover, any other types of algorithms or classifiers may also be used.

For instance, analysis of temperature data for a particular food item 126 and actions taken by a customer 114 that previously ordered that food item 126 may be analyzed using machine learning techniques to determine how hot/cold the food item 126 should be for the food item 126 to be acceptable for customers 114. Input for the machine learning techniques may include temperatures of the food item 126 when delivered to customers 114 and inaction/action by those customers 114 with respect to the delivered food item 126. The customer inaction/action may include instances in which the customer 114 received the delivery order of the food item 126 without any further input by the customer, positive customer feedback, and negative customer feedback, such as instances in which customers 114 stated that the temperature of the food item 126 was not ideal, customer requests for refunds/discounts with respect to the food item 126, and so on. Additional input may include instances in which the deliverer 110 of the food item 126 indicated that the temperature of the food item 126 was, or was not, appropriate. Using one or more machine learning techniques, and based on the sensor data 136 (e.g., temperature values of the food item 126), the service provider 102 may determine temperatures of the food item 126 in which customers 114 found the food item 126 to be unacceptable or acceptable.

Moreover, certain events or instances may comprise the condition of a food item 126 during delivery. For instance, provided that the food item 126 is being transported within the delivery container 134 via a car, the car accelerating rapidly or stopping quickly may result in a change in acceleration that may cause the food item 126 to spill (e.g., soup) or break (e.g., a fortune cookie). Spillage or breakage may also be caused by a change in orientation of the food item container 132 and/or the delivery container 134, which may be caused by one of the containers shifting positions within a car, or it being carried in a careless manner by the deliverer 110. In addition to spillage or breakage, a change in acceleration or orientation may cause a negative change in the presentation or aesthetics of the food item 126, such as different food items 126 mixing together or a food item 126 being presented in a manner that was not intended by the merchant 106. Accordingly, for different food items 126, the service provider 102 may determine a change in acceleration threshold and/or a change in orientation threshold. As will be discussed below, the sensor(s) 206 of the food item container 132 may yield sensor data 136 that indicates an acceleration and/or orientation of the food item container 132, and changes in the acceleration/orientation may indicate a possibility that the condition of the food item 126 has been compromised.

Similar to the temperature-based thresholds, the acceleration/orientation thresholds, as well as humidity thresholds, pressure thresholds, viscosity thresholds, etc., may be determined using one or more machine learning techniques. For instance, based on sensor data 136 obtained while a food item 126 is being delivered to customers 114, the service provider 102 may determine an amount of change in acceleration or change in orientation (or an degree of angle experienced by the food item 126) that the food item 126 can sustain before the food item 126 becomes comprised (e.g., spilled, broken, etc.). The acceleration/orientation thresholds for a particular food item 126 may be based on varying degrees in which the food item 126 previously experienced a change in acceleration/orientation during delivery, and whether the change in acceleration/orientation caused the condition or presentation of the food item 126 to be compromised. This may be based on feedback provided by the deliverer 110 (e.g., confirmation that the condition of the food item 126 has/has not been compromised), a lack of customer feedback, which likely indicates that the condition of the food item 126 was acceptable upon delivery, and/or feedback from customers 114, which may take the form of customer complaints (e.g., the food item 126 spilled), refund requests, discount requests, and so on.

In various embodiments, the service provider 102 may determine whether one or more thresholds associated with a food item 126 that is being delivered to a customer 114 has been exceeded, which may indicate that the temperature, humidity, pressure, viscosity, etc., of the food item 126 is not at an acceptable level, or which may indicate that the condition/presentation of the food item 126 may have been compromised. As stated above, the aggregated sensor data 136 obtained by the sensor(s) 206 of the food item container 132 and during delivery of the food item 126 within the delivery container 134 may be stored and analyzed by the service provider 102. A determination that a threshold for the food item 126 has been exceeded may cause the service provider 102 to generate and transmit the food item instruction(s) 138 to the food item container 132 and/or the delivery container 134, where the food item instructions 138 may cause the food item characteristic regulation component(s) 208 to maintain and/or adjust one or more of the food item characteristics 212. Such a determination may also cause the service provider 102 to notify the customer 114 that ordered the food item 126 or to instruct the deliverer 110 to inspect the food item 126 in order to verify the temperature, humidity, pressure, and/or condition of the food item 126 that he/she is currently delivering.

Accordingly, the service provider 102, the merchant 106, and/or the customer 114 may specify the food item characteristics 212 associated with a particular food item 126, which may be maintained by the service provider 102. And, in some embodiments, the service provider 102 may instruct the merchant 106 to prepare/cook/provide the food item 126 in a particular manner, such as in a manner preferred by a customer 114 that placed an order 128 for the food item 126. Upon receiving sensor data 136 (and/or images/video depicting the food item(s) 126) from the communication component(s) 210 of the food item container 132 and/or the delivery container 134, the service provider 102 may determine the current characteristics/conditions associated with the food item(s) 126, the food item container 132, and/or the delivery container 134. The service provider 102 may also determine whether the current characteristics/conditions meet the expected/intended/ideal characteristics/standards. If so, the service provider 102 may transmit food item instructions 138 indicating that the food item characteristic regulation component(s) 208 maintain the current food item characteristics 212. However, if the current characteristics fall below the expected/intended/ideal conditions/characteristics, the food item instructions 138 may instruct the food item characteristic regulation component(s) 208 to adjust one or more of the food item characteristics 212 associated with the food item(s) 126, the food item container 132, and/or the delivery container 134. The collection of sensor data 136 by the sensor(s) 206 and the determination of whether to maintain or adjust current characteristic values associated with the food items 126, the food item container 132, and/or the delivery container 134 may continue and repeat while the food items 126 are contained in the food item container 132, and while the food item container(s) 132 are included in the delivery container(s) 134. As a result, the condition/status of the food items 126 may be continuously monitored, maintained, and adjusted on an ongoing basis. In some embodiments, although the sensor data 136 may be obtained over time, the sensor data 136 may be batched and sent to the service provider 102 at particular times. This may also occur if the food item container 132 and/or the delivery container 134 is unable to transmit the sensor data 136 for some reason. For instance, assuming that the communication component(s) 210 are unable to obtain a suitable connection to transmit the sensor data 136 (e.g., no/low Wi-Fi connection, no/low cellular connection, etc.), the sensor data 136 may be transmitted when the connection is reestablished or has improved.

As an illustrative example, assume that a particular food item 126 may be associated with a temperature threshold, meaning that the food item 126 is intended to be consumed at a temperature value that is above or below that threshold temperature value. Provided that the food item 126 (e.g., an ice cream bar) is currently being delivered to a customer 114, and is being delivered in the food item container 132, the sensor(s) 206 may continuously, or at various intervals (e.g., every second, every five seconds, every minute, etc.), determine the temperature of the food item 126. For instance, one or more infrared thermometers or temperature probes may continuously monitor the temperature within the food item container 132 to ensure that the food item 126 is of an acceptable temperature when the food item 126 is delivered to the customer 114. Provided that the sensor data 136 indicates that the temperature has not exceeded or has become less than the temperature threshold value during delivery or at a time of delivery, such as the temperature of the ice cream bar not being warmer than the temperature threshold value (e.g., 10 degrees Fahrenheit) or the temperature of hot soup being greater than its temperature threshold value (e.g., 160 degrees Fahrenheit), the service provider 102 may conclude that the temperature of the food item 126 will be acceptable to the customer 114 (e.g., the ice cream bar has not melted, the soup has not become cold, etc.). However, if the sensor data 136 indicates that the temperature of the food item 126 has exceeded or become less than the temperature threshold value, such as the temperature of the ice cream bar being warmer than the temperature threshold value (e.g., 10 degrees Fahrenheit) or the temperature of the soup being colder than the temperature threshold value (e.g., 160 degrees Fahrenheit), the service provider 102 may determine that the temperature of the food item 126 will not be within an ideal temperature range for the customer 114. As a result, the service provider 102 may send food item instructions 138 to the food item container 132, which may cause the food item characteristic regulation component(s) 208 to apply heat to the food item(s) 126/food item container 132 for the purpose of increasing the temperature of the food item(s) 126. Ideally, the temperature of the food item(s) 126 will then be at or exceed its ideal/consumption temperature (or temperature range).

In certain embodiments, provided that one or more food items 126 are being cooked/warmed within the food item container 132 during delivery, the food item container 132, the delivery container 134, the service provider 102, and/or the customer 114 may determine when the food item container 132 should cease to cook the food item(s) 126. The food item characteristic regulation component(s) 208 may adjust one of the food item characteristics 212 so that the food item(s) 126 will be delivered to the customer 114 in its ideal state/condition, which may be based on a preference of the customer 114. Provided that images/video of the food item(s) 126 captured during delivery of the food item(s) 126 are provided to a customer device 116 of the customer 114, the customer 114 may send instructions to adjust one or more of the food item characteristics 212, such as reducing the amount of heat being applied to the food item(s) 126. For instance, if the customer 114 prefers a medium rare steak, the customer 114 may send instructions when the image(s)/video depict that the steak appears to be in its preferred condition. In some embodiments, the image(s)/video that depict the food item(s) 126 within the food item container 132 may be displayed to the customer 114 via his/her customer device 116, a deliverer device 112 of the deliverer 110, or via a display associated with the food item container 132 or the delivery container 134.

In certain embodiments, the food item container 132(*s*), the delivery container(s) 134, and/or the service provider 102 may determine if the condition of a food item 126 has been compromised (e.g., spoiled). Based on the sensor data 136, it may be determined that a food item characteristic 212 associated with the food item 126 has exceeded or fallen below a particular threshold, which may be different from the thresholds discussed above. For instance, the sensor data 136 may indicate that the temperature of a food item 126 (e.g., soup) has fallen below a particular temperature threshold (e.g., 90 degrees), which may indicate that the food item 126 should not be consumed. Time may also be considered when determining of the condition of a food item 126 has been compromised. For example, it may be determined that the temperature of the food item 126 has been below a threshold temperature for a particular period of time (e.g., 15 minutes). Accordingly, this food item condition threshold may indicate conditions in which food items 126 should be deemed unfit for consumption. This threshold may be based on input from the merchants 106, reference manuals, food item regulations, or any other source. Provided that a food item condition threshold has been satisfied, the food item container 132/delivery container 134 may provide an alert to the service provider 102. In other scenarios, an alert may be transmitted to the merchant 106 that prepared/provided the food item 126, the deliverer device 112 of the deliverer 110 that is transporting the food item 126, and/or the customer 114 that placed the order 128 for the food item 126. For instance, the service provider 102 may instruct the merchant 106 to prepare/provide a replacement food item 126, instruct the deliverer 110 to cease delivering that food item 126, and/or notify the customer 114 that the ordered food item 126 is being replaced and that delivery may be delayed.

Although the term "food item" is used herein, the items ordered by customers 114 and subsequently delivered by the deliverers 110 may include any type of items, such as food items 126, drink items, and other types of products. As the sensors 206 of the food item container 132 and/or delivery device 134 may determine a temperature within the food item container 132, items that are prone to melting or changing in appearance may be suitable. For instance, when exposed to higher temperatures, materials such as wax or plastic may melt or change shape. Accordingly, the service provider 102 may desire to monitor the temperature/condition of items such as wax candles (and other wax items), plastic toys, plastic bottles, and so on.

In addition, certain items ordered by a customer 114 may be fragile, and may thus be susceptible to breaking during delivery. As a result, various sensors 206 of the food item container 132 and/or the delivery container 134 (e.g., an accelerometer, motion detector, gyroscope, etc.) may detect the acceleration (or change in acceleration), velocity (or change in velocity), orientation (or change in orientation), vibration, motion, etc., of the items during delivery. The sensor data 136 obtained by the sensors 206 of the food item container 132 and/or the delivery container 134 may determine that a particular threshold (e.g., a change in acceleration threshold) has been exceeded, which may indicate that the item to be delivered may have been broken, cracked, etc. As a result, the service provider 102 may elect to request that the deliverer 110 inspect the item(s) to determine and confirm their respective condition. Such items that may be breakable, fragile, or susceptible to damage during delivery may include items made of glass (e.g., glasses, plates, vases, etc.), mirrors, electronics (e.g., televisions, computers, etc.), furniture (may be scratched or broken), and so on.

Figure 3:
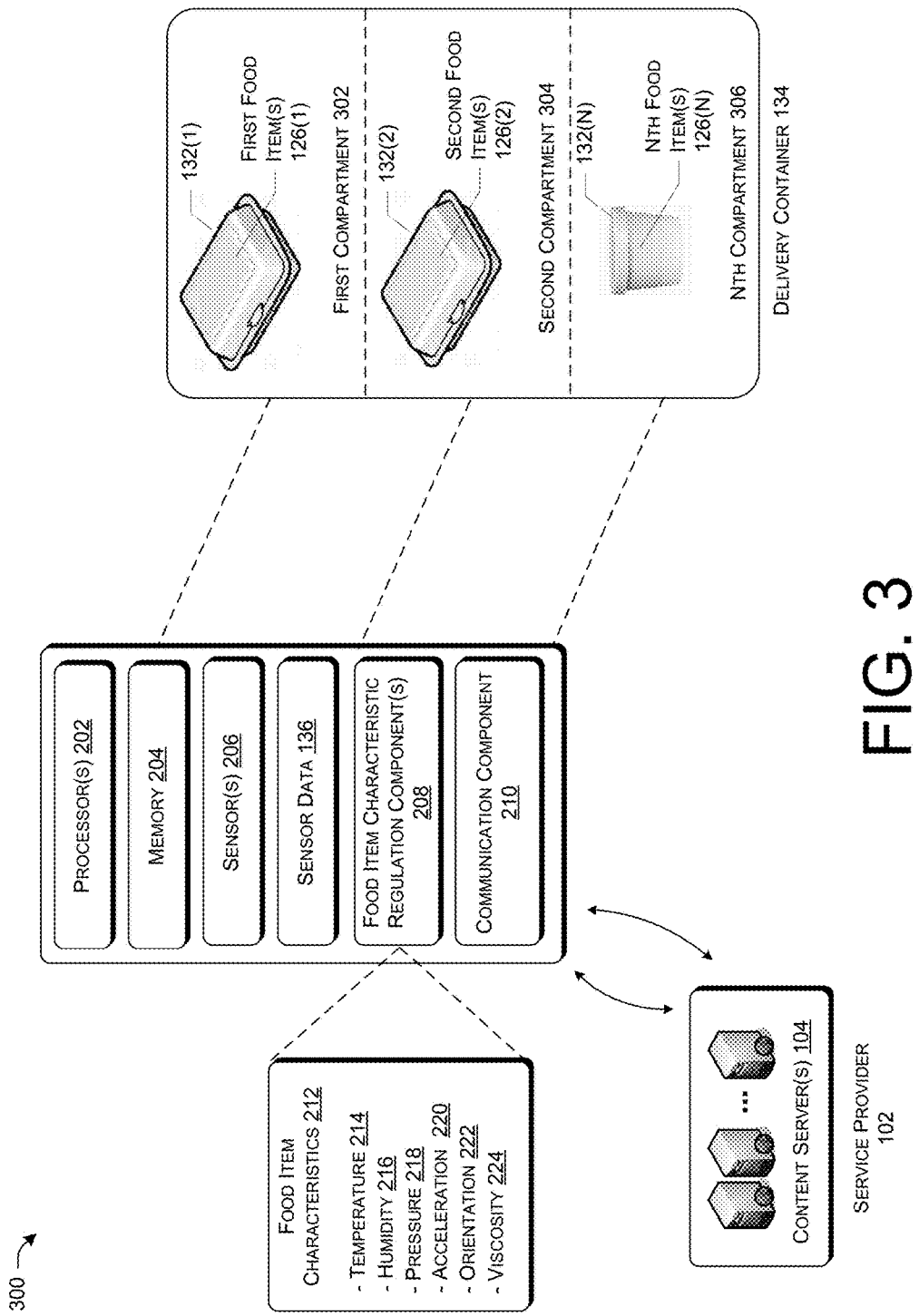
FIG. 3 illustrates an example system for maintaining and/or adjusting characteristics of a food item during delivery using a delivery container that transports one or more food item containers that include food items.

FIG. 3 illustrates an example system 300 for maintaining and/or adjusting the characteristics of food items using a food item container and/or a delivery container. More particularly, the system 300 may include a delivery container 134 that contains one or more food item containers 132, where each of the food item containers 132 includes one or more food items 126. The system 300 may also include the content server(s) 104 associated with the service provider 102. Similar to the food item container 132 illustrated in FIG. 2, the delivery container 134 may include one or more processors 202, memory 204, one or more sensors 206, sensor data 136 obtained/detected by the sensor(s) 206, one or more food item characteristic regulation components 208, and one or more communication components 210.

As described herein, food items 126 prepared/provided by a merchant 106 (e.g., a restaurant) may place the food items 126 in a food item container 132 for delivery. Upon a deliverer 110 arriving at a location of the merchant 106, the deliverer 110 may place one or more food item containers 132 into a delivery container 134 used to transport the food item(s) 126 to a delivery location associated with a customer 114 that placed the order 128 for the food item(s) 126. In certain embodiments, the delivery container 134 may include one or more sensor(s) 206 that obtain sensor data 136 regarding an interior of the delivery container 134 that contains the food item container(s) 132 and the corresponding food item(s) 126. The sensor(s) 206 are described above with respect to FIG. 2 and may be positioned in any location on or within the delivery container 134 (e.g., in different compartments). In certain embodiments, the delivery container 134 may process/analyze the sensor data 136 and, in other embodiments, the communication component(s) 210 of the delivery container 134 may send the sensor data 136 to a different device, such as the content server(s) 104, the merchant device(s) 108, the deliverer device(s) 112, the customer device(s) 116, and/or the food item container(s) 132. The communication component(s) 210 of the delivery container 134 are similar to those discussed above with respect to FIG. 2.

In various embodiments, the food item characteristic regulation component(s) 208, which are discussed above with respect to FIG. 2, maintain and/or adjust one or more food item characteristics 212 associated with the delivery container 134, the food item container(s) 132, and/or the food item(s) 126 included within the food item container(s) 132. The food item characteristics 212 may include at least temperature 214, humidity 216, pressure 218, acceleration 220, orientation 222, and viscosity 224. Based at least partly on the sensor data 136 obtained by the sensor(s) 206 of the delivery container 134, food item characteristic regulation component(s) 208 of the delivery container 134 may maintain and/or adjust one or more of the food item characteristics 212. For instance, if the sensor data 136 indicates that the food item(s) 126 are likely in an ideal/acceptable/expected condition, the food item characteristic regulation component(s) 208 may maintain the current food item characteristics associated with the food item(s) 126. However, if the sensor data 136 indicates that the food item(s) 126 are not likely to be in an ideal/acceptable/expected condition (e.g., too cold), the food item characteristic regulation component(s) 208 may adjust one of the food item characteristics 212 (e.g., apply heat to the food item container 132/food item(s) 126). The communication component(s) 210 of the delivery container 134 may also instruct the food item characteristic regulation component(s) 208 of the food item container 132 to maintain or adjust one or more of the food item characteristics 212 (e.g., increase temperature, decrease humidity, etc.).

In some embodiments, the communication component(s) 210 of the delivery container 134 may transmit the sensor data 136 to the content server(s) 104 of the service provider 102. The delivery container 134 may then receive food item instructions 138 from the service provider 102, where the food item instructions 138 cause the food item characteristic regulation component(s) 208 to either maintain or adjust one or more of the food item characteristics 212. For instance, the food item instructions 138 may indicate that the temperature 214, humidity 216, pressure 218, etc., within the delivery container 134 should be increased or decreased. As a result, the current conditions/state of the food item(s) 126 included within the food item container(s) 132, which are contained in the delivery container 134, may be maintained or adjusted by the delivery container 134 during delivery of the food item(s) 126.

In some embodiments, the delivery container 134 may include a single compartment, section, portion, etc., that may contain one or more food item containers 132. However, in other embodiments, the delivery container 134 may transport multiple different food item containers 132 that each contain a different type of food item 126. For instance, the delivery container 132 may transport a steak, French fries, and a milkshake. In this scenario, the steak may need to be kept hot/warm during delivery so that the steak is delivered at an ideal consumption temperature. It may be desirable to keep the French fries at a low humidity level so that they do not become soggy, and remain crisp/crunchy, during delivery. Moreover, the milkshake should remain cold/frozen during delivery so that it is delivered at an acceptable consumption state. Accordingly, the delivery container 134 may include multiple (and any number of) compartments, portions, or sections that are configured to transport/contain different types of food items 126 that have different needs. As shown in FIG. 3, the delivery container 134 may include a first compartment 302 that includes a first food item container 132(1) containing one or more first food items 126(1), a second compartment 304 that includes a second food item container 132(2) containing one or more second food items 126(2), and an Nth compartment 304 that includes a third food item container 132(N) containing one or more Nth food items 126(N). Each compartment may include one or more sensor(s) 206 that obtains/detects various types of sensor data 136, one or more food item characteristic regulation components 208 that are able to maintain and/or adjust various food item characteristics 212, and/or one or more communication components 210 that are configured to transmit the obtained sensor data 136. Moreover, the food item containers 132 included within the delivery container 134 may be the same or different. That is, the delivery container 134 may include multiple food item containers 132 that are each more sophisticated, meaning that they include sensors 126, food item characteristic regulation components 208, communication components 210, etc. The delivery container 134 may also contain non-sophisticated food item containers 132 (e.g., a disposable cardboard, plastic, etc., bag/box). In other embodiments, the delivery container 134 may container food item containers 132 that are both sophisticated and non-sophisticated. As shown in FIG. 3, food item container 132(N) is illustrated as being different from food item containers 132(1) and 132(2).

Using the example listed above, if the steak, French fries, and milkshake were included in the same food item container 132, or were included in different food item container 132 within the same compartment of the delivery container 134, the hamburger may become cool, the French fries may become soggy, and the milkshake may melt during delivery to the customer 114. That is, it may be difficult to keep multiple different food items 126 at their ideal temperature 214, humidity 216, viscosity 224, etc. Accordingly, these food items 126 may be placed in different food item containers 132 in different compartments of the delivery container 134. In this example, the steak may be included in the first food item container 132(1) in the first compartment 302 of the delivery container 134. In the first compartment 302, the food item characteristic regulation component(s) 208 may apply heat to the hamburger/first food item container 132 in order to maintain (or increase, if necessary) its temperature 214. In the second compartment 304, the food item characteristic regulation component(s) 208 may maintain (or decrease, if necessary) the humidity 216 within the second compartment 304 so that the French fries remain crisp/crunchy, and not soggy. Moreover, in the Nth compartment 306, the food item characteristic regulation component(s) 208 may maintain the milkshake at a low temperature so that the milkshake remains frozen and does not melt. If necessary, the food item characteristic regulation component(s) 208 associated with the Nth compartment 306 may decrease the temperature 214 associated with the milkshake/Nth food item container 126(N) to ensure that the milkshake remains in an acceptable condition. During delivery, the sensor(s) 206 (e.g., temperature sensor(s) 206, humidity sensor(s) 206, etc.) may continuously monitor the food item characteristics 212 associated with each compartment so it can be determined whether the food item characteristic regulation component(s) 208 should maintain or adjust one or more of the food item characteristics 212.

In other embodiments, different ingredients of a single food item 126 may be placed in different compartments of the same food item container 132, or may be placed in different food item containers 132 that reside in different compartments of the delivery container 134. The different compartments of the food item container 132 and/or the delivery container 134 may monitor, maintain, and/or adjust food item characteristics 212 of the different ingredients. As an illustrative example, assume that a cheeseburger includes a bun, a beef patty with cheese, and lettuce. These ingredients of the cheeseburger may be stored/transported in different compartments so that they each remain in an acceptable condition for delivery and consumption by the customer 114. For instance, the bun may be kept in a compartment having low humidity 216 so that the bun does not become soggy. The beef patty with cheese may be kept at a higher temperature 214 and a higher humidity 216 so that the beef patty remains warm/hot and moist, and so that the cheese remains melted. Moreover, the lettuce may be placed in a compartment having a lower temperature 214 so that the lettuce remains crisp and does not wilt. Therefore, containing and transporting the ingredients of a food item 126 in different food item containers 132 and compartments may cause each ingredient to arrive at the delivery location in their intended/expected condition. The deliverer 110 may assemble the food item 126 when he/she arrives at the delivery location, or the customer 114 may do so upon delivery.

In additional embodiments, different ingredients of the same food item 126 may be included in different compartments/portions of the same food item container 132. Then, prior to delivery of the food item 126, the multiple ingredients may be combined or mixed, resulting in the food item 126 being in its ideal consumption state. For example, for ramen and broth, the ramen and broth are typically kept in different food item containers 132 during delivery and the customer 114 combines the ingredients after the ramen/broth is delivered. If the ramen/broth are combined at the restaurant, then there is a higher likelihood that the noodles would become soggy/soft during delivery. Instead, the ramen and broth may be contained in different food item containers 132, or within the same food item container 132 but separated. Shortly before delivery, the broth may be injected or poured into the noodles so that the ramen and broth are in their optimal condition upon delivery. A similar issue results when salad dressing is poured on salad at the restaurant—the lettuce and other vegetables may become soggy/soft/wilted. Accordingly, prior to delivery, the salad dressing may be poured/squirted on the salad so that the salad arrives at its optimal condition, and so the customer 114 need not combine the ingredients himself/herself. In one scenario, the different ingredients may be placed in different sections/compartments of the same food item container 132, but a divider/partition may separate the ingredients. Upon delivery, or shortly before delivery, the divider/partition may be removed, which may result in the ingredients (e.g., chicken and sauce, pasta and pasta sauce, etc.) becoming combined.

Provided that the food item(s) 126 delivered to the customer 114 require further preparation prior to consumption, the customer 114 may be provided with instructions for combining, further preparing, cooking, etc., the food item(s) 126. The instructions may be provided via his/her customer device 116 and may be based on the current conditions of the food item(s) 126 upon delivery. For instance, based on the temperature of food item(s) 126 when delivered to the customer 114, which may be based on the sensor data 136 obtained by the sensor(s) 206 just prior to delivery, the instructions may instruct the customer 114 to heat the food item(s) 126 for a particular period of time. The instructions may also instruct the customer 114 how to combine the food items 126, prepare different ingredients of the food item(s) 126, and so on.

In further embodiments, the food item container 132, the delivery container 134, and/or different compartments within the delivery container 134 may include a power source, such as a battery, an outlet, a plug, and so on. The power source may be utilized to power the food item characteristic regulation component(s) 208 of the food item container 132 and/or the delivery container 134. In some embodiments, the food item container 132 may utilize the power source of the delivery container 134 in order to adjust one or more food item characteristics 212 associated with the food items 126, and vice versa. Moreover, in other embodiments, different food item containers 132 may communication with one another, such as by transmitting sensor data 136 to one another or by sending food item instructions 138 that cause a food item container 132 to maintain or adjust one or more food item characteristics 212 associated with a food item 126 or the environment within that food item container 132.

Figure 4:
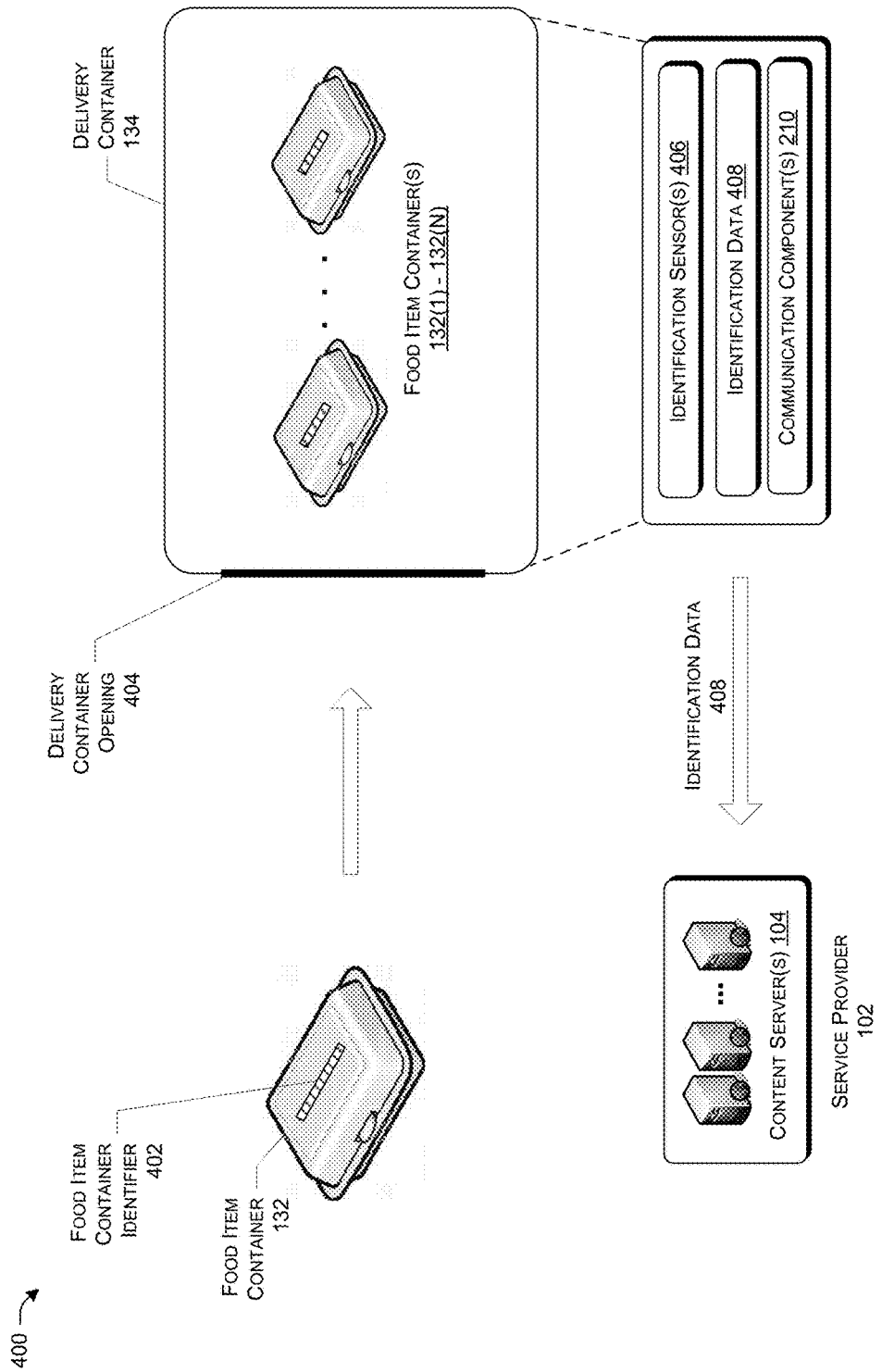
FIG. 4 illustrates an example system for determining the identity of food item containers and corresponding food items using a delivery container that transports the food item containers for delivery.

FIG. 4 illustrates an example system 400 for identifying food item container(s) and/or food items that enter, or that are currently included within, a delivery container. As shown, the system 400 may include the content server(s) 104 associated with the service provider 102, a delivery container 134, and one or more food item containers 132(1)-132(N). The food item container 132 may include one or more food item container identifiers 402 and the delivery container 134 may include one or more delivery container openings 404, one or more identification sensors 406, identification data 408 obtained/detected by the identification sensor(s) 406, and one or more communication components 210, as discussed above with respect to FIGS. 1-3.

In various embodiments, the food item containers 132 that contain the food items 126 may be identifiable in some manner, such as by including one or more food item container identifiers 402. For the purposes of this discussion, a food item container identifier 402 associated with a food item container 132 may be any type of identifier that uniquely identifies that particular food item container 132. The food item container identifier 402 may be visibly displayed on an exterior surface of the food item container 132, such as on a top surface of the food item container 132. In this scenario, the food item container identifier 402 may include a color, a pattern, a barcode, an RFID sticker, a QR code, an image, and/or one or more characters (e.g., numbers, letters, symbols, etc.). The food item container identifier 402 may be a tag that is attached to the food item container 132, may be applied to the food item container 132 using ink or paint (or a different writing material), may be affixed on an exterior surface of the food item container 132 in some manner, such as using a sticker or an adhesive (e.g., glue), and so on. The food item container identifier 402 may be part of the food item container 132 itself. For instance, the food item container 132 may be manufactured as having one or more food item container identifiers 402. In other embodiments, the food item container identifier 402 may be a chip (e.g., an RFID chip). Regardless of the type of food item container identifier 402, the food item container 132 may include any number of food item container identifiers 402 that may be positioned anywhere on, or within, the food item container 132.

As a result of including food item container identifiers 402 with the food item containers 132, the service provider 102 may track which food items 126 are included within which food item containers 132, which food item containers 132 are associated with a particular order 128, and which food item containers 132 are included within which delivery containers 134. As illustrated in FIG. 4, the delivery container 134 may include one or more delivery container openings 404 that are used to place any number of the food item containers 132(1)-132(N) within the delivery container 134. The delivery container 134 may include one or more identification sensors 406 that are configured to identify/detect the food item container identifiers 402 that are associated with the different food item containers 132(1)-132(N). The identification sensor(s) 406 may include a scanning device (e.g., a scanner) that may identify and detect the QR codes, barcodes, etc. In other embodiments, the identification sensor(s) 406 may include an imaging device, such as a camera, that captures images and/or video of the food item containers 132 as they enter the delivery container 134 via the delivery container opening 404. The imaging device may also capture images/video of the food item containers 132(1)-132(N) while they are within the delivery container 134. The images/video captured by the imaging device may depict the food item container identifiers 402 associated with the food item containers 132, which may include the colors, patterns, characters, barcodes, QR codes, stickers, etc., as described herein.

Provided that the food item container identifier 402 is an RFID sticker, tag, or chip, the identification sensor 406 associated with the delivery container 134 may be an RFID reader. The RFID reader may use electromagnetic fields in order to automatically identify and track RFID tags/chips that are associated with a food item container 132. A passive RFID tag associated with the food item container 132 may collect energy from the RFID reader's interrogating radio waves, while an active RFID tag associated with the food item container 132 may have a local power source (e.g., a battery) and the RFID reader may be able to detect the active RFID tag from greater distances. Unlike a barcode, the RFID tag need not be within the line of sight of the RFID reader, so the RFID tag may be embedded within one of the surfaces of the food item container 132, or may be included within the food item container 132. Accordingly, provided that the food item container identifier 402 of the food item container 132 is an RFID chip/sticker/tag, and that the identification sensor 406 of the delivery container 134 is an RFID reader, the RFID reader may detect that certain food item containers 132 are entering the delivery container 134 via the delivery container opening 404 and/or that certain food item container(s) 132(1)-132(N) are currently within the delivery container 134. Accordingly, the RFID reader may detect any RFID chips/tags/stickers in close proximity to the RFID reader, such that the delivery container 134 serves as an RFID fence, and that the RFID reader is configured to detect any RFID chips/tags/stickers, and corresponding food item containers 132(1)-132(N), that are included within that RFID fence.

The data/information obtained by the identification sensor(s) 406 of the delivery container 134 (e.g., images/video, barcodes, RFID data, etc.) may be referred to herein as identification data 408. The communication component(s) 210 of the delivery container 134 may transmit the identification data 408 (and any other data or information) to the content server(s) 104, or any other device for that matter. The service provider 102 may analyze/process the identification data 408 to determine which food item containers 132(1)-132(N) are included within a particular delivery container 134. Provided that the identification data 408 includes barcodes, QR codes, etc., the service provider 102 may derive such identifiers from the identification data 408. In some embodiments, the service provider 102 may utilize one or more computer vision techniques/algorithms with respect to images/video included within the identification data 408. For instance, the service provider 102 may use one or more computer vision algorithms and/or optical character recognition (OCR) techniques to identify the food item container identifiers 402 depicted in the captured images/video. Such identifiers 402 may include colors, patterns, characters, symbols, images, and so on. As a result, for a particular delivery container 134, the service provider 102 may be aware of which food item containers 132 have been placed within the delivery container 134 by the merchant 106, the deliverer 110, or any other entity/person.

Since the service provider 102 received an order 128 for a food item 126 from a customer 114, that order 128 and the food item 126 included within the order 128 may be associated with the customer 114. Moreover, the food item container 132 used to package the ordered food item 126 may associated with that food item 126 and/or the corresponding order 128. The identification sensor(s) 406 of a delivery container 134 may then detect the food item container identifier 402 associated with that food item container 132 that contains the ordered food item 126. Then, identification data 408 corresponding to the data/information obtained by the identification sensor(s) 406 of the delivery container 134 may then be provided to the service provider 102. Upon identifying the food item container identifier 402 from the identification data 408, the service provider 102 may determine that the food item container 132 is included within the delivery container 134, and that food item container 132 and delivery container 134 may be associated with one another. As a result, the service provider 102 may be aware of which food items 126 are included within each delivery container 134, and which orders 128 are associated with each food item 126. Based on this information, the service provider 102 may confirm that each food item 126 included within the order 128 is included within the delivery container 134 that is being used to transport the ordered food items 126 to the customer 114 that placed the order 128. If so, the service provider 102 may allow the delivery to continue. However, if the service provider 102 determines that the delivery container 134 being used to deliver the ordered food items 126 is incomplete or is inaccurate/incorrect, the service provider 102 may take action, such as by notifying the deliverer 110 that is in possession of the delivery container 134, notifying the merchant 106 that provided/prepared the ordered food items 126, and/or notifying the customer 114 that placed the order 128.

In other embodiments, the delivery container 134 need not transmit the identification data 408 to the service provider 102/content server(s) 104. The delivery container 134 may instead determine which food item containers 132 are currently included therein, which may allow the delivery container 134 to determine whether an order 128 is accurate and complete.

FIGS. 5-8 illustrate example processes of maintain and/or adjusting one or more characteristics of a food item during delivery to a customer. These processes (as well as each process described herein) are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

Figure 5:
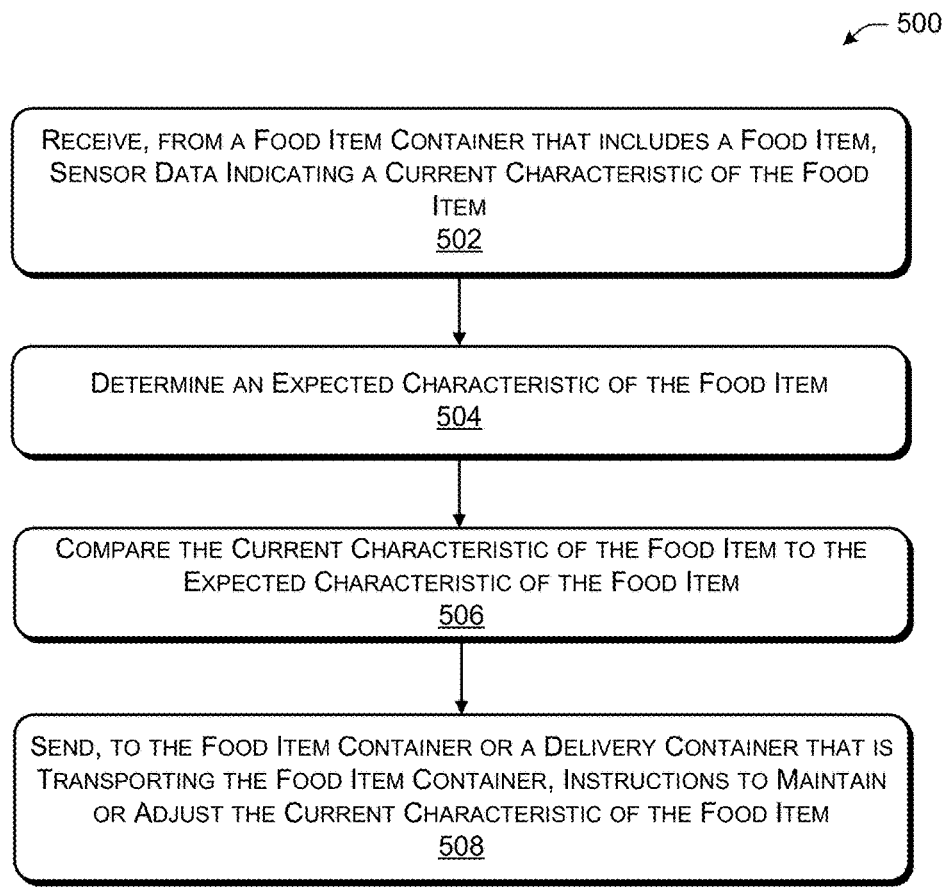
FIG. 5 is a flow diagram illustrating an example process of sending, to a food item container and/or a delivery container, instructions to maintain or adjust a characteristic of a food item within the food item container based on sensor data obtained from a sensor associated with the food item container.

FIG. 5 illustrates a flow diagram of an example process 500 of sending instructions to maintain and/or adjust one or more characteristics of a food item based on sensor data received from a food item container. Moreover, the following actions described with respect to FIG. 5 may be performed by the service provider 102, the content server(s) 104, the food item container(s) 132, and/or the delivery container(s) 134, as illustrated with respect to FIGS. 1-4.

Block 502 illustrates receiving, from a food item container that includes a food item, sensor data indicating a current characteristic of the food item. In various embodiments, food items 126 ordered by a customer 114 may be placed in a food item container 132, such as a box, a bag, etc. The food item container 132 may include one or more sensor(s) 206 that detect sensor data 136 associated with the food item 126 and/or the interior of the food item container 132. The sensor data 136 may correspond to temperature data, humidity data, pressure data, acceleration/orientation data, viscosity data, and so on. A communication component 210 of the food item container 132 may transmit the sensor data 136 to one or more of several devices, including the content server(s) 104, the merchant device(s) 108, the deliverer device(s) 112, the customer device(s) 116, and/or the delivery container 134 that is used to transport the food item container 132. The sensor data 136 may indicate a current characteristic value (e.g., temperature value, humidity value, etc.) associated with the food item 126, such as a current characteristic value of the environment within the food item container 132.

Block 504 illustrates determining an expected characteristic of the food item. More particularly, the service provider 102, the merchant 106, and/or the customer 114 may specify preferred conditions in which the food item 126 is to be delivered and/or consumed. For instance, the expected characteristic value of the food item 126 may be that the food item 126 is expected to be consumed at a particular temperature or range of temperatures, a particular humidity, and so on. In various embodiments, the expected characteristic value may be a threshold value, as discussed elsewhere herein.

Block 506 illustrates comparing the current characteristic of the food item to the expected characteristic of the food item. Upon determining the current characteristic value of the food item 126 based on the sensor data 136 received from the food item container 132, and determining the expected characteristic value (e.g., the threshold value) of the food item 126, the two characteristic values may be compared, such as by the service provider 102, the food item container 132, and/or the delivery container 134.

Block 508 illustrates sending, to the food item container or a delivery container that is transporting the food item container, instructions to maintain or adjust the current characteristic of the food item. Based on a comparison of the current characteristic value and the expected characteristic value, it may be determined that the current characteristic(s) of the food item 126, which are based on the sensor data 136, are consistent with the expected characteristics of the food item 126 (e.g., temperature range, humidity level, etc.). In that case, one or more food item instructions 138 may be sent to the food item container 132 and/or the delivery container 134. The food item instructions 138 may indicate that the current characteristics associated with the food item 126 may be maintained by the food item characteristic regulation component(s) 208. In some embodiments, the food item container 132 and/or the delivery container 134 may make this determination/decision on its own. However, if the current characteristic(s) of the food item 126 fall below the expected characteristic(s), then the food item container 132 and/or the delivery container 134 may cause the food item characteristic regulation component(s) 208 to adjust the current characteristic value, such as by increasing/decreasing the temperature, humidity, pressure, etc., associated with the food item 126 or an environment within the food item container 132 and/or the delivery container 134. Provided that the service provider 102 performs the comparison illustrated in block 506, then the service provider 102 may send food item instructions 138 to the food item container 132 and/or the delivery container 134 in order to cause the food item characteristic regulation component(s) 208 to adjust the current characteristic value(s) associated with the food item 126.

Figure 6:
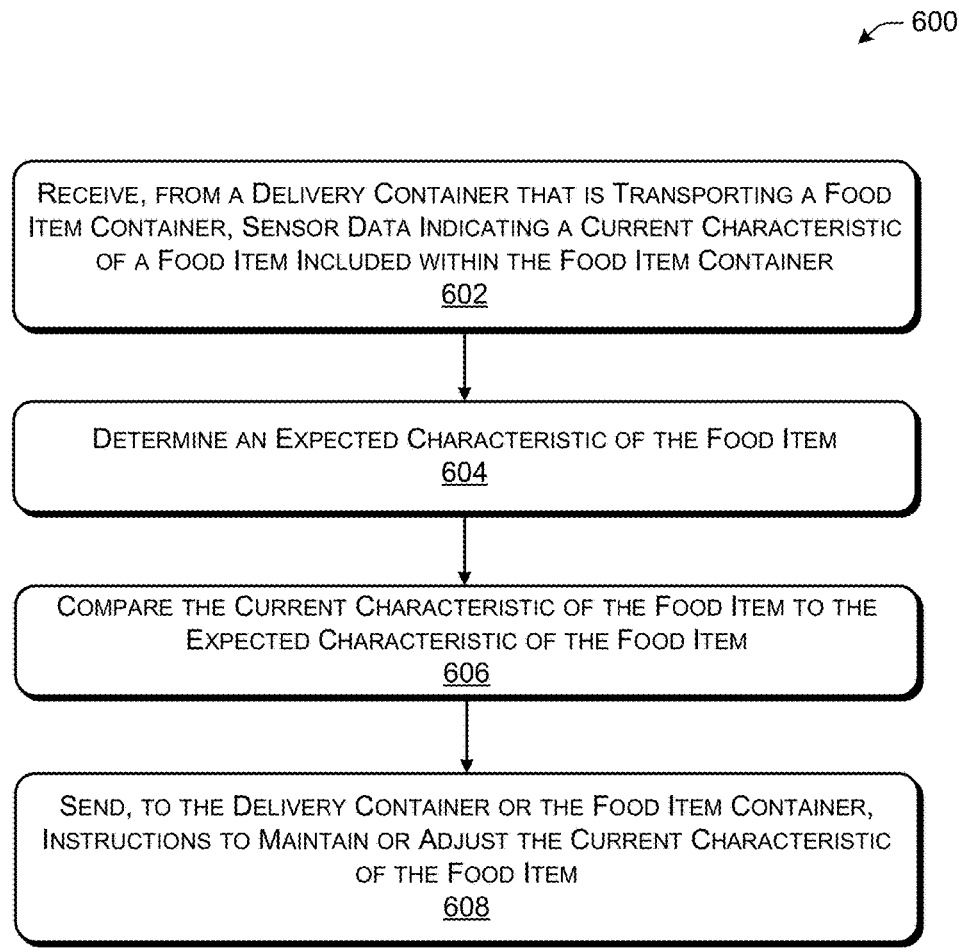
FIG. 6 is a flow diagram illustrating an example process of sending, to a food item container and/or a delivery container, instructions to maintain or adjust a characteristic of a food item within the food item container based on sensor data obtained from a sensor associated with the delivery container.

FIG. 6 illustrates a flow diagram of an example process 600 of sending instructions to maintain and/or adjust one or more characteristics of a food item based on sensor data received from a delivery container. Moreover, the following actions described with respect to FIG. 6 may be performed by the service provider 102, the content server(s) 104, the food item container(s) 132, and/or the delivery container(s) 134, as illustrated with respect to FIGS. 1-4.

Block 602 illustrates receiving, from a delivery container that is transporting a food item container, sensor data indicating a current characteristic of a food item included within the food item container. In various embodiments, the delivery container 134 may include one or more sensor(s) 206 that detect sensor data 136 associated with the food item 126 and/or the interior of the delivery container 134. As stated above, the sensor data 136 may correspond to temperature data, humidity data, pressure data, acceleration/orientation data, viscosity data, and so on. A communication component 210 of the delivery container 134 may transmit the sensor data 136 to one or more of several devices, including the content server(s) 104, the merchant device(s) 108, the deliverer device(s) 112, the customer device(s) 116, and/or the food item container 132 that contains the food item 126. The sensor data 136 may indicate a current characteristic value (e.g., temperature value, humidity value, etc.) associated with the food item 126, which may include a current characteristic value of an environment within the delivery container 134.

Block 604 illustrates determining an expected characteristic of the food item. More particularly, the service provider 102, the merchant 106, and/or the customer 114 may specify preferred conditions in which the food item 126 is to be delivered and/or consumed. For instance, the expected characteristic value (e.g., a threshold value) of the food item 126 may be that the food item 126 is expected to be consumed at a particular temperature or range of temperatures, a particular humidity, and so on.

Block 606 illustrates comparing the current characteristic of the food item to the expected characteristic of the food item. Upon determining the current characteristic value of the food item 126 based on the sensor data 136 received from the food item container 132, and determining the expected characteristic value of the food item 126, the two characteristic values may be compared, such as by the service provider 102, the food item container 132, and/or the delivery container 134.

Block 608 illustrates sending, to the delivery container or the food item container, instructions to maintain or adjust the current characteristic of the food item. Based on a comparison of the current characteristic value and the expected characteristic value, it may be determined that the current characteristic value(s) of the food item 126, which are based on the sensor data 136, are consistent with the expected characteristic values of the food item 126 (e.g., temperature range, humidity level, etc.). In that case, one or more food item instructions 138 may be sent to the food item container 132 and/or the delivery container 134. The food item instructions 138 may indicate that the current characteristic values associated with the food item 126 may be maintained by the food item characteristic regulation component(s) 208. In some embodiments, the food item container 132 and/or the delivery container 134 may make this determination/decision on its own. However, if the current characteristic value(s) of the food item 126 fall below the expected characteristic value(s), then the food item container 132 and/or the delivery container 134 may cause the food item characteristic regulation component(s) 208 to adjust the current characteristic value, such as by increasing/decreasing the temperature, humidity, pressure, etc., associated with the food item 126 or an environment within the food item container 132 and/or the delivery container 134. Provided that the service provider 102 performs the comparison illustrated in block 606, then the service provider 102 may send food item instructions 138 to the food item container 132 and/or the delivery container 134 in order to cause the food item characteristic regulation component(s) 208 to adjust the current characteristic values associated with the food item 126.

Figure 7:
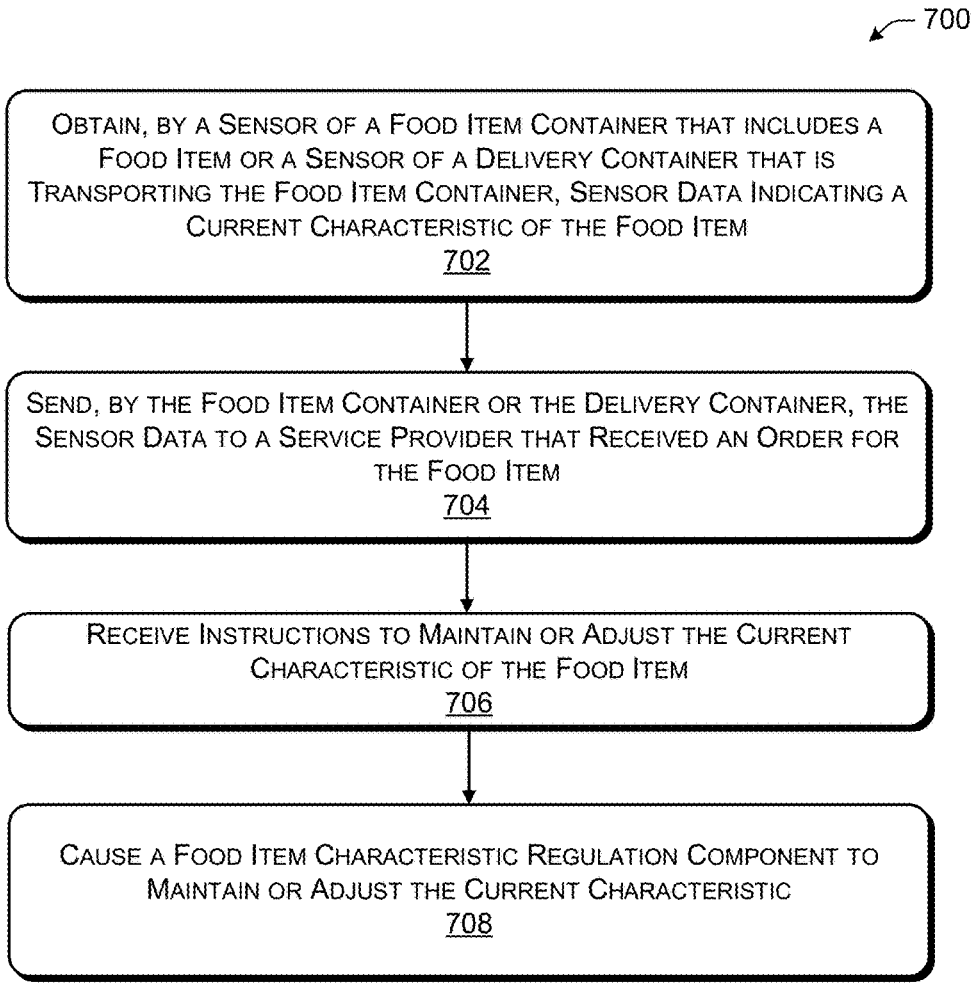
FIG. 7 is a flow diagram illustrating an example process of causing a food item container or a delivery container to maintain or adjust a characteristic of a food item within the food item container based on sensor data and instructions received from a service provider.

FIG. 7 illustrates a flow diagram of an example process 700 of determining sensor data associated with a food item and causing a current characteristic of the food item to be maintained and/or adjusted. Moreover, the following actions described with respect to FIG. 7 may be performed by the service provider 102, the content server(s) 104, the food item container(s) 132, and/or the delivery container(s) 134, as illustrated with respect to FIGS. 1-4.

Block 702 illustrates obtaining, by a sensor of a food item container that includes a food item or a sensor of a delivery container that is transporting the food item container, sensor data indicating a current characteristic of the food item. In various embodiments, the sensor(s) 206 of the food item container 132 may detect characteristics/conditions associated with the food item 126 and/or the environment within the food item container 132, which may include temperature, humidity, pressure, orientation, and so on. Moreover, the sensor(s) 206 of the delivery container 134 may detect characteristics/conditions associated with the food item 126 and/or the environment within the delivery container 134, which may also include temperature, humidity, pressure, orientation, etc. Such characteristics may indicate the current condition(s) of the food item 126 during delivery to the customer 114 by the deliverer 110. The sensor(s) 206 may be actively, passively, continuously, and/or periodically monitoring the environments within the food item container 132 and/or the delivery container 134. The food item container 132, the delivery container 134, or both may include the sensor(s) 206 that obtain/detect the sensor data 136.

Block 704 illustrates sending, by the food item container of the delivery container, the sensor data to a service provider that received an order for the food item. In some embodiments, the communication component(s) 210 of the food item container 132 and/or the delivery container 134 may send the sensor data 136 to the service provider 102. However, in other embodiments, the sensor data 136 may be sent to the merchant device(s) 108 associated with the merchant 106 that provided the food item 126, the deliverer device 112 of the deliverer 110 that is transporting the food item 126 using the delivery container 134, and/or the customer device 116 of the customer 114 that placed the order 128 for the food item 126. The sensor data 136 may also be communicated between the food item container 132 and the delivery container 134 without involving the service provider 102. In other embodiments, the entity that obtains the sensor data 136 (e.g., the food item container 132, the delivery container 134, etc.) may not transmit the sensor data 136. In that scenario, the food item container 132 and/or the delivery container 134 may process/analyze the sensor data 136 to determine whether the food item characteristics 212 associated with the food items 126 are at an ideal/acceptable level.

Block 706 illustrates receiving instructions to maintain or adjust the current characteristics of the food item. In some embodiments, the service provider 102 may send the food item instructions 138 to maintain or adjust the current characteristic values of the food item 126 and/or the environment within the food item container 132 and/or the delivery container 134. In other embodiments, the food item instructions 138 may be sent between the food item container 132 and the delivery container 134. Moreover, in some instances, either the food item container 132 or the delivery container 134 may determine to maintain/adjust the current characteristic values of the food item 126 on their own.

Block 708 illustrates causing a food item characteristic regulation component to maintain or adjust the current characteristic. Possibly based on the food item instructions 138, the food item characteristic regulation component(s) 208 of the food item container 132 and/or the delivery container 134 may maintain or adjust the temperature, pressure, humidity, orientation, viscosity, etc., associated with the food item 126, and/or the environments within the food item container 132 and/or the delivery container 134. As a result, the food items 126 are more likely to be delivered and consumed in their idea/acceptable conditions.

Figure 8:
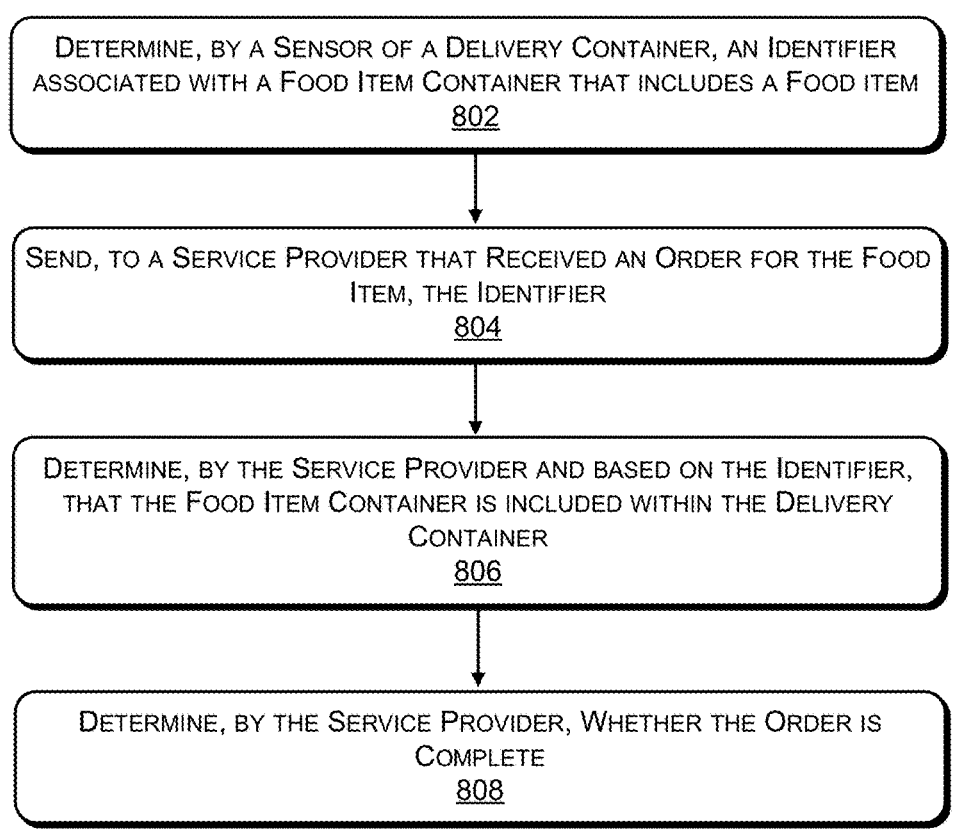
FIG. 8 is a flow diagram illustrating an example process of determining that a food item container is included within a delivery container and that a food item within the food item container is part of an order based on an identifier associated with the food item container.

FIG. 8 illustrates a flow diagram of an example process 800 of using an identifier of a food item container to confirm the accuracy and/or completeness of an order for a food item. Moreover, the following actions described with respect to FIG. 8 may be performed by the service provider 102, the content server(s) 104, the food item container(s) 132, and/or the delivery container(s) 134, as illustrated with respect to FIGS. 1-4.

Block 802 illustrates determining, by a sensor of a delivery container, an identifier associated with a food item container that includes a food item. As discussed herein, an identification sensor 406 of the delivery container 134 may detect a food item container identifier 402 associated with a food item container 132, such as when the food item container 132 enters a delivery container opening 404 of the delivery container 134 or while the food item container 132 is within the delivery container 134. The food item container identifier 402 may include some designation that uniquely identifies/distinguishes the food item container 132, such as a color, a pattern, a barcode, a QR code, one or more characters/text/numbers, one or more symbols, an image/picture, an RFID tag/chip/sticker, and so on.

Block 804 illustrates sending, to a service provider that received an order for the food item, the identifier. Upon determining the food item container identifier 402 associated with a food item container 132, a communication component 210 of the delivery container 134 may send identification data 408 to the service provider 102, where the identification data 408 may include the food item container identifier 402.

Block 806 illustrates determining, by the service provider and based on the identifier, that the food item container is included within the delivery container. In certain embodiments, the service provider 102 associates the food item container identifier 402 with that particular food item container 132. Accordingly, when a particular delivery container 134 sends the food item container identifier 402 to the service provider 102, the service provider 102 may infer/determine that that particular food item container 132 is within that delivery container 134. The service provider 102 may also associate the food item container 132 with the particular delivery container 134 that the food item container 132 is included within.

Block 808 illustrates determining, by the service provider, whether the order is complete. The service provider 102 is aware of which food items 126 are associated with the order 128, and which food items 126 are included within each food item container 132. Since the service provider 102 is able to determine which food item containers 132 are within a delivery container 134, the service provider 102 may determine which food items 126 are within each delivery container 134. Based on a review of the order 128, the service provider 102 may determine whether each food item 126 included within the order 128 is currently included in the delivery container 134. If so, the food item(s) 126 may be delivered to the customer 114 that placed the order 128. If not, however, the service provider 102 may notify the merchant 106, the deliverer 110, the customer 114, and/or the delivery container 134.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
  a delivery container configured to transport food items contained within food item containers, the delivery container comprising:
    one or more sensors to detect an identifier associated with a food item container that contains a food item, the one or more sensors including a Radio-Frequency Identification (RFID) reader and the identifier including an RFID identifier; and
    one or more communication components that transmit identification data that includes the RFID identifier; and
  one or more content servers associated with a service provider that received an order for the food item, the one or more content servers storing one or more computer-executable instructions that, when executed by one or more processors, cause the one or more processors to:
    receive, from the delivery container, the identification data;
    determine that the food item associated with the order is included within the food item container;
    determine, based at least partly on the RFID identifier, that the food item container is currently included within the delivery container;
    associate the food item container with the delivery container; and
    confirm whether the order is complete based at least partly on a determination of whether each food item associated with the order is included within the delivery container.

2. The system as recited in claim 1, wherein the one or more sensors include a scanning device and the identifier includes at least one of a barcode or a Quick Response (QR) code.

3. The system as recited in claim 1, wherein the one or more sensors include an imaging device and the identifier includes at least one of a color, a pattern, one or more characters, a barcode, or a QR code, and wherein:
  the imaging device captures at least one of an image or video that depicts the identifier; and
  the computer-executable instructions are further executable by the one or more processors to apply at least one of one or more computer vision techniques or one or more optical character recognition (OCR) techniques to the image or the video in order to detect the identifier.

4. The system as recited in claim 1, wherein the computer-executable instructions are further executable by the one or more processors to determine that the food item container is currently included within the delivery container based at least partly on a determination that the food item container is physically coupled to the delivery container.

5. The system as recited in claim 1, wherein the identifier is at least one of displayed on an exterior surface of the food item container, embedded in a surface of the food item container, or included within an interior of the food item container.

6. A system comprising:
  a food item container that contains a food item and an identifier; and
  a delivery container that transports the food item container, the delivery container comprising:
    one or more sensors that detect the identifier; and
    at least one of:
      one or more communication components that transmit the identifier to a different device; or
      one or more processors that are configured to determine that the food item container is within the delivery container based at least partly on the identifier.

7. The system as recited in claim 6, wherein the one or more sensors detect the identifier as the food item container enters a delivery container opening of the delivery container.

8. The system as recited in claim 6, wherein the one or more sensors detect the identifier while the food item container is within an interior of the delivery container.

9. The system as recited in claim 6, wherein the one or more sensors include at least one of a scanning device, a RFID reader, or an imaging device that captures at least one of images or video.

10. The system as recited in claim 6, wherein the identifier is at least one of a color, a pattern, a symbol, one or more characters, a RFID identifier, a barcode, or a QR code.

11. The system as recited in claim 6, wherein the different device is one or more content servers associated with a service provider that received an order for the food item, the one or more content servers storing one or more computer-executable instructions that, when executed by one or more second processors, cause the one or more second processors to:
  receive, from the delivery container, the identifier;
  determine that the identifier is associated with the food item container; and
  confirm that the food item container is included within the delivery container.

12. The system as recited in claim 11, wherein determining that the identifier is associated with the food item container comprises applying at least one of one or more computer vision techniques or one or more OCR techniques to at least one of an image or video that depicts the identifier in order to detect the identifier.

13. The system as recited in claim 6, wherein the identifier is at least one of displayed on an exterior surface of the food item container, embedded in a surface of the food item container, or included within an interior of the food item container.

14. The system as recited in claim 6, wherein the different device is one or more content servers associated with a service provider that received an order for the food item, the one or more content servers storing one or more computer-executable instructions that, when executed by one or more second processors, cause the one or more second processors to determine that the food item container is currently included within the delivery container based at least partly on a determination that the food item container is physically coupled to the delivery container.

15. A method comprising:
   receiving, from a delivery container, identification data that includes an identifier;
   determining that the identifier is associated with a food item container;
   determining, based at least partly on the identifier being associated with the food item container, that the food item container is included within the delivery container;
   determining that the food item is associated with an order; and
   determining whether each food item, including the food item, associated with the order is included within the delivery container.

16. The method as recited in claim 15, wherein the identifier is at least one of a color, a pattern, a symbol, one or more characters, a QR code, a barcode, or an RFID identifier, and wherein the identifier is detected by at least one of a scanning device, an imaging device, or an RFID reader associated with the delivery container.

17. The method as recited in claim 15, wherein the identification data includes at least one of an image or video that depicts the identifier, and further comprising applying at least one of one or more computer vision techniques or one or more OCR techniques to at least one of the image or the video in order to detect the identifier.

18. The method as recited in claim 15, further comprising:
   determining that each food item associated with the order is included within the delivery container; and
   sending, to a deliverer device of a deliverer, an instruction to transport the delivery container to a delivery location of a customer that placed the order.

19. The method as recited in claim 15, further comprising:
   determining that each food item associated with the order is not included within the delivery container; and
   sending, to at least one of a deliverer device of a deliverer that is in possession of the delivery container or a restaurant merchant that provided the food item, an instruction indicating that the order is incomplete.

20. The method as recited in claim 15, wherein determining that the food item container is included within the delivery container is based at least partly on a determination that the food item container is physically coupled to the delivery container.

* * * * *